US009393589B2

(12) United States Patent
Olmeijer et al.

(10) Patent No.: US 9,393,589 B2
(45) Date of Patent: Jul. 19, 2016

(54) METHODS AND MATERIALS FOR FUNCTIONAL POLYIONIC SPECIES AND DEPOSITION THEREOF

(71) Applicant: Eastman Chemical Company, Kingsport, TN (US)

(72) Inventors: David Olmeijer, San Francisco, CA (US); J. Wallace Parce, Palo Alto, CA (US); Benjamin Wang, Mountain View, CA (US); Kevin Krogman, Santa Clara, CA (US)

(73) Assignee: Eastman Chemical Company, Kingsport, TN (US)

( * ) Notice: Subject to any disclaimer, the term of this patent is extended or adjusted under 35 U.S.C. 154(b) by 159 days.

(21) Appl. No.: 13/967,770

(22) Filed: Aug. 15, 2013

(65) Prior Publication Data
US 2014/0242393 A1 Aug. 28, 2014

Related U.S. Application Data

(63) Continuation of application No. PCT/US2012/025138, filed on Feb. 14, 2012.

(60) Provisional application No. 61/443,196, filed on Feb. 15, 2011.

(51) Int. Cl.
*B05D 5/12* (2006.01)
*B05D 7/02* (2006.01)
*B05D 1/18* (2006.01)
*B05D 1/02* (2006.01)
*B05D 1/20* (2006.01)
*B05D 3/00* (2006.01)
*B05D 3/10* (2006.01)
*B05D 7/00* (2006.01)
*B05D 1/36* (2006.01)
*C08J 7/04* (2006.01)
*C09D 183/00* (2006.01)
*C08F 10/00* (2006.01)
*C08F 18/14* (2006.01)
*C08F 220/32* (2006.01)
*C09D 133/14* (2006.01)

(52) U.S. Cl.
CPC *B05D 1/185* (2013.01); *B05D 1/02* (2013.01); *B05D 1/204* (2013.01); *B05D 1/208* (2013.01); *B05D 1/36* (2013.01); *B05D 3/007* (2013.01); *B05D 3/107* (2013.01); *B05D 7/54* (2013.01); *B05D 7/56* (2013.01); *B05D 7/58* (2013.01); *B05D 2350/35* (2013.01); *B05D 2518/10* (2013.01); *C08F 18/14* (2013.01); *C08F 220/32* (2013.01); *C09D 133/14* (2013.01); *Y10S 977/882* (2013.01); *Y10S 977/883* (2013.01); *Y10S 977/895* (2013.01); *Y10S 977/896* (2013.01); *Y10S 977/897* (2013.01); *Y10T 428/31511* (2015.04); *Y10T 428/31663* (2015.04); *Y10T 428/31938* (2015.04)

(58) Field of Classification Search
None
See application file for complete search history.

(56) References Cited

U.S. PATENT DOCUMENTS

| 3,978,264 | A | 8/1976 | Tarbell et al. | |
| 4,410,501 | A | 10/1983 | Taramasso et al. | |
| 4,973,511 | A | 11/1990 | Farmer et al. | |
| 5,019,197 | A | 5/1991 | Henderson | |
| 5,091,258 | A | 2/1992 | Moran | |
| 5,264,058 | A | 11/1993 | Hoagland et al. | |
| 5,925,228 | A | 7/1999 | Panitz et al. | |
| 6,221,112 | B1 | 4/2001 | Snider | |
| 6,627,175 | B2 | 9/2003 | Schoebrechts | |
| 7,311,943 | B2 * | 12/2007 | Jacobson | B05D 1/185 427/258 |
| 8,234,998 | B2 | 8/2012 | Krogman et al. | |
| 8,277,899 | B2 | 10/2012 | Krogman et al. | |
| 8,689,726 | B2 | 4/2014 | Krogman et al. | |
| 2001/0046564 | A1 | 11/2001 | Kotov | |
| 2001/0048975 | A1 * | 12/2001 | Winterton | A61L 27/34 427/412.1 |
| 2003/0167878 | A1 | 9/2003 | Al-Salim et al. | |
| 2005/0019550 | A1 | 1/2005 | McGurran et al. | |
| 2005/0025976 | A1 | 2/2005 | Faris | |
| 2006/0029634 | A1 | 2/2006 | Berg et al. | |
| 2006/0234032 | A1 | 10/2006 | Morrison et al. | |
| 2007/0032869 | A1 | 2/2007 | Gilliard et al. | |
| 2007/0054194 | A1 * | 3/2007 | Zhang | H01B 1/122 429/313 |
| 2007/0104922 | A1 | 5/2007 | Zhai et al. | |
| 2008/0060302 | A1 | 3/2008 | Bletsos et al. | |

(Continued)

FOREIGN PATENT DOCUMENTS

EP 1 046 068 B1 5/2003
EP 2 130 844 A1 * 12/2009
(Continued)

OTHER PUBLICATIONS

PCT/US2012/025138, International Preliminary Report on Patentability, Aug. 21, 2013, 4 pages.*

(Continued)

Primary Examiner — William Phillip Fletcher, III
(74) Attorney, Agent, or Firm — John P. Foryt

(57) ABSTRACT

The invention provides materials and methods for forming coatings on substrates. The coatings are durable and resistant to damage from environmental, chemical, thermal, and/or radiative sources. In some embodiments, the coatings comprise bilayers of electrostatically charged materials. The bilayers are created by alternately applying solutions comprising water-soluble, electrostatically charged materials. Durability is imparted to the coatings by the formation of crosslinks that are formed within and between layers after deposition of the coatings.

6 Claims, No Drawings

(56) References Cited

U.S. PATENT DOCUMENTS

| | | | |
|---|---|---|---|
| 2008/0299036 A1 | 12/2008 | Vitner et al. |
| 2009/0015908 A1 | 1/2009 | Ando et al. |
| 2009/0153953 A1 | 6/2009 | Banerjee et al. |
| 2009/0155545 A1 | 6/2009 | Purdy et al. |
| 2009/0161220 A1 | 6/2009 | Banerjee et al. |
| 2009/0209665 A1 | 8/2009 | Fu et al. |
| 2010/0003499 A1 | 1/2010 | Krogman et al. |
| 2010/0092377 A1 | 4/2010 | Scott et al. |
| 2010/0098902 A1 | 4/2010 | Kotov et al. |
| 2010/0208349 A1 | 8/2010 | Beer et al. |
| 2010/0209593 A1 | 8/2010 | Banerjee et al. |
| 2010/0304150 A1 | 12/2010 | Zheng et al. |
| 2010/0315693 A1 | 12/2010 | Lam et al. |
| 2011/0014366 A1 | 1/2011 | Nogueira et al. |
| 2011/0089018 A1 | 4/2011 | Chang et al. |
| 2011/0135888 A1 | 6/2011 | Xu et al. |
| 2011/0274767 A1 | 11/2011 | Kato et al. |
| 2012/0028005 A1 | 2/2012 | Zheng et al. |
| 2012/0082831 A1 | 4/2012 | Wang et al. |
| 2012/0194819 A1 | 8/2012 | Varma |
| 2013/0108832 A1 | 5/2013 | Domercq et al. |
| 2013/0183516 A1 | 7/2013 | Krogman et al. |
| 2013/0273242 A1 | 10/2013 | Krogman et al. |
| 2014/0079884 A1 | 3/2014 | Krogman et al. |
| 2014/0079922 A1 | 3/2014 | Wang et al. |
| 2014/0218792 A1 | 8/2014 | Krogman et al. |
| 2014/0220351 A1 | 8/2014 | Krogman et al. |
| 2014/0242321 A1 | 8/2014 | Schmid et al. |

FOREIGN PATENT DOCUMENTS

| | | |
|---|---|---|
| EP | 2130844 A1 | 12/2009 |
| EP | 2226364 A1 | 9/2010 |
| EP | 2 343 579 A1 | 7/2011 |
| GB | 2 198 739 A | 6/1988 |
| JP | H 04 197427 A | 7/1992 |
| JP | 11 292537 A | 10/1999 |
| JP | 2008 041377 A | 2/2008 |
| JP | 2010 132514 A | 6/2010 |
| KR | 10-2004-0086912 A | 10/2004 |
| KR | 10-2005-0059582 A | 6/2005 |
| KR | 10-2011-0082625 A | 7/2011 |
| WO | WO 2005/072947 A1 | 8/2005 |
| WO | WO 2012/075309 A1 | 6/2012 |
| WO | 2012112624 A3 | 8/2012 |
| WO | PCT/US2012/025138 | 8/2014 |

OTHER PUBLICATIONS

Co-pending U.S. Appl. No. 14/569,955, filed Dec. 15, 2014, Nand et al.
ASTM G173-03; Standard Tables for Reference Solar Spectral Irradiances: Direct Normal and Hemispherical on 37° Tilted Surface.
ASTM D1003-07; Standard Test Method for Haze and Luminous Transmittance of Transparent Plastics.
ASTM D1787-89; Standard Test Method for Pentosans in Cellulose.
ASTM D3359-09$^{e2}$; Standard Test Methods for Measuring Adhesion by Tape Test.
ASTM D4329-13; Standard Practice for Fluorescent Ultraviolet (UV) Lamp Apparatus Exposure of Plastics.
ASTM D4587-11; Standard Practice for Fluorescent UV-Condensation Exposures of Paint and Related Coatings.
Hennink et al.; "Novel crosslinking methods to design hydrogels"; Advanced Drug Delivery Reviews; vol. 54 (2002); pp. 13-36.
Krogman, et al.; "Automated Process for Improved Uniformity and Versatility of Layer-by-Layer Deposition"; Langmuir 2007, 23, pp. 3137-3141.
Nolte, Adam John; "Fundamental Studies of Polyelectrolyte Multilayer Films: Optical, Mechanical, and Lithographic Property Control"; Thesis (PhD); Massachusetts Institute of Technology; Dept. of Materials Science and Engineering; Feb. 2007 (Abstract, pp. 32-29, Figure 2.3).
Rouse, et al.; "Sol-Gel Processing of Ordered Multilayers to Produce Composite Films of Controlled Thickness"; Chem. Mater.; 2000; 12; pp. 2502-2507.
Kim, et al.; "Synthesis and Structures of New Layered Ternary Manganese Tellurides: $AMnTe_2$ (A=K, Rb, Cs) $Na_3Mn_4Te_6$, and $NaMn_{1.56}Te_2$"; Inorg. Chem.; 1999; 38; pp. 235-242.
Kim, et al.; "Hydrothermal synthesis of titanium dioxides using basic peptizing agents and their photocatalytic activity"; Chemical Engineering Science; 62 (2007); pp. 5154-5159.
PCT International Search Report for International Application No. PCT/US2011/064397 with date of mailing Jun. 6, 2012.
PCT International Search Report for International Application No. PCT/US2012/025138 with date of mailing Oct. 30, 2012.
PCT International Search Report for International Application No. PCT/US2012/059147 with date of mailing Mar. 28, 2013.
PCT International Search Report for International Application No. PCT/US2012/062892 with date of mailing Mar. 29, 2013.
PCT International Search Report for International Application No. PCT/US2012/059142 with date of mailing Apr. 29, 2013.
PCT International Search Report for International Application No. PCT/US2013/059337 with date of mailing Dec. 6, 2013.
USPTO Office Action dated May 21, 2014 in co-pending U.S. Appl. No. 14/024,649.
USPTO Office Action dated Jul. 23, 2014 in co-pending U.S. Appl. No. 13/633,809.
USPTO Office Action dated Sep. 25, 2014 in co-pending U.S. Appl. No. 14/024,649.
USPTO Office Action dated Feb. 11, 2015 in co-pending U.S. Appl. No. 13/633,809.
USPTO Office Action dated Jun. 5, 2015 in co-pending U.S. Appl. No. 13/861,368.
USPTO Office Action dated Jul. 8, 2015 in co-pending U.S. Appl. No. 14/246,084.
Cammarata, et al.; "Carbodiimide Induced Cross-Linking, Ligand Addition, and Degradation in Gelatin"; Molecular Pharmaceutics; 2015; 12; pp. 783-793.
Lee et al., Formation of Nanoparticle-Loaded Microcapsules Based on Hydrogen-Bonded Multilayers, Chem. Mater., 2005, vol. 17, pp. 1099-1105.
USPTO Office Action dated Sep. 8, 2015 in co-pending U.S. Appl. No. 13/633,809.
USPTO Office Action dated Sep. 11, 2015 in co-pending U.S. Appl. No. 14/024,649.
USPTO Notice of Allowance dated Feb. 11, 2016 in co-pending U.S. Appl. No. 14/569,955.
USPTO Office Action dated Feb. 16, 2016 in co-pending U.S. Appl. No. 13/633,809.
USPTO Office Action dated Oct. 30, 2015 in co-pending U.S. Appl. No. 14/028,450.
Wu et al.; "Deformable Antireflection Coatings from Polymer and Nanoparticle Multilayers"; Advanced Materials, 2006, 18, pp. 2699-2702.
USPTO Office Action dated Dec. 4, 2015 in co-pending U.S. Appl. No. 13/861,368.
USPTO Office Action dated Dec. 17, 2015 in co-pending U.S. Appl. No. 14/246,096.
USPTO Notice of Allowance dated Jan. 20, 2016 in co-pending U.S. Appl. No. 14/569,955.

\* cited by examiner

METHODS AND MATERIALS FOR FUNCTIONAL POLYIONIC SPECIES AND DEPOSITION THEREOF

CROSS REFERENCE TO RELATED APPLICATIONS

This application claims priority to PCT application PCT/US2012/025138, filed Feb. 14, 2012, which claims priority to U.S. Provisional Application 61/433,196, filed Feb. 15, 2011, the contents of which are incorporated herein in their entirities.

BACKGROUND

Polyionic molecules are synthesized and naturally occurring compounds and are widely used across a range of applications including rheology modifiers, cosmetics, water treatment and nutrition applications. Polyionic molecules include polyelectrolytes, such as positively charged polycations, negatively charged polyanions, or zwitterionic polymers, as well as other polyionic species including metal oxide nanoparticles, metal sulfide nanoparticles, or functionalized nanoparticles. Some polyionic molecules include hydrogen donors and acceptors. Some polyionic compounds are used in methods for forming coatings, such as by Layer-by-Layer deposition methods.

Layer-by-Layer (LbL) processes typically build films making use of charge-charge, hydrogen bonding, or other complementary interactions to assemble successive layers. This typically requires the use of solvents to ionize molecules or support hydrogen donation and acceptance in the deposition solutions. While it is possible to use alcohols, glycols, and other organic solvents, water is the solvent of preference due to its low cost and low toxicity. This is particularly true for spray LbL where it is undesirable to aerosolize organic solvents. The use of water as solvent means that the scope of materials that can be used in traditional LbL and similar methods is restricted, and that the resulting product coatings are limited in their performance and range of properties.

SUMMARY

In one aspect of the disclosure, there is provided a method for coating a surface, the method comprising (a) depositing a first material comprising first reversible bonding moieties and first crosslinkable moieties; and (b) depositing a second material comprising second reversible bonding moieties, wherein the second reversible bonding moieties are complementary to the first reversible bonding moieties and are capable of forming a reversible chemical bond, and wherein the first material and the second material form a bilayer; (c) optionally depositing one or more additional bilayers on the surface, wherein the coating is stabilized by one or more of: (1) ionic attractive forces between any two adjacent layers (2) hydrogen bonding attractive forces between any two adjacent layers; and (3) covalent bonding between bilayers.

In some such aspects, the first reversible bonding moieties are selected from ionic moieties, hydrogen-bonding moieties, ligand-substrate moieties, and antibody-antigen moieties. In some such aspects, the first crosslinkable moieties are chemically attached to the first material and are selected from vinyl, alkenes, alkynes, acrylates, methacrylates, silanes, siloxanes, titanates, epoxy, alkoxides, metal alkoxy precursors, phosphonates and combinations thereof. In some such aspects, the first material is water soluble and is deposited as part of a first deposition solution, and the second material is water soluble and is part of a second deposition solution. In some such aspects, the first material is selected from a polyelectrolyte and a functionalized polyelectrolyte, and wherein the second material is selected from a second polyelectrolyte, a second functionalized polyelectrolyte, and nanoparticles. In some such aspects, the second material comprises second crosslinkable moieties, and wherein the method comprises crosslinking the first crosslinkable moieties, crosslinking the second crosslinkable moieties, or crosslinking both first and second crosslinking moieties.

In some such aspects, the first material is a polymer comprising repeat units of formula (I) and repeat units of formula (II)

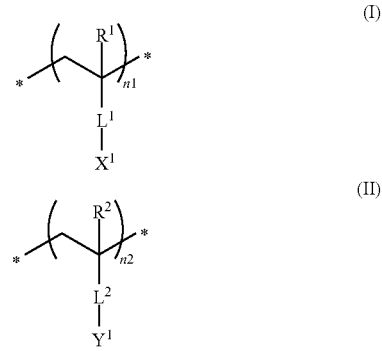

wherein, in formula (I) and formula (II): $n1$ and $n2$ are independently integers; $R^1$ and $R^2$ are independently selected from H and lower alkyl; $L^1$ and $L^2$ are linker moieties independently selected from a bond or an alkylene, arylene, or alkenylene moiety, any of which may contain one or more heteroatoms and may be unsubstituted or substituted; $X^1$ is an ionic moiety; and $Y^1$ is a crosslinkable moiety. In some such aspects, $Y^1$ is selected from trialkoxysilanes, triaryloxysilanes, mixed alkoxy and aryloxy silanes, and epoxy, and wherein $X^1$ is an amine or carboxylic acid.

In some such aspects, the first material and the second material have opposite charges. In some such aspects, there is provided a coating on a surface prepared according to the method.

In another aspect, there is provided a method for forming a coating solution, the method comprising reacting a first polyelectrolyte with a multifunctional compound in a solvent to form a functionalized polyelectrolyte, wherein the multifunctional compound comprises a coupling group and a first crosslinkable moiety, and wherein the first polyelectrolyte comprises a complementary coupling group that is capable of reacting with the coupling group of the multifunctional compound, and wherein the functionalized polyelectrolyte is water soluble.

In some such aspects, the coupling group of the multifunctional compound and the complementary coupling group of the first polyelectrolyte are independently selected from ionic and non-ionic moieties. In some such aspects, the coupling group of the multifunctional compound and the complementary coupling group of the first polyelectrolyte are both non-ionic groups and are capable of reacting to form a covalent bond. In some such aspects, the coupling group of the multifunctional compound and the complementary coupling group of the first polyelectrolyte are both ionic groups and are capable of reacting to form an ionic bond. In some such aspects, one of the coupling group of the multifunctional compound and the complementary coupling group of the first polyelectrolyte is an ionic group and the other of the coupling group of the multifunctional compound and the complementary coupling group of the first polyelectrolyte is a non-ionic group, and the two groups are capable of reacting to form a covalent bond.

In some such aspects, the multifunctional compound is sparingly water soluble or water insoluble. In some such aspects, the method comprises reacting the first polyelectrolyte with a plurality of multifunctional compound molecules, wherein the functionalized polyelectrolyte comprises a polyelectrolyte covalently attached to a plurality of first crosslinkable moieties. In some such aspects, the solvent is water, or the solvent is non-aqueous and the method comprises isolating the functionalized polyelectrolyte from the solvent and combining the functionalized polyelectrolyte with water.

In some such aspects, the coupling group and the complementary coupling group are selected from amines, carboxylates, sulfates, sulfites, phosphates, phosphites, thiols, hydroxyls, epoxies, and combinations thereof, and wherein the crosslinkable moiety is selected from vinyl, acrylates, alkenes, silanes, titanates, epoxy, alkoxy, and combinations thereof. In some such aspects, the functionalized polyelectrolyte is a nanoparticle. In some such aspects, the functionalized polyelectrolyte is a polymeric silane precursor, and wherein the crosslinkable and ionizable moieties are alkyl silanes. In some such aspects, there is provided a coating solution prepared according to the method, wherein the functionalized polyelectrolyte comprises a plurality of crosslinkable moieties and a plurality of ionic moieties.

In another aspect, there is provided a compound comprising a plurality of crosslinkable moieties and a plurality of first ionic moieties. In some such aspects, there is provided a method for forming such compound, wherein the method comprises reacting a first polyelectrolyte and a multifunctional compound. In some such aspects, there is provided a coating solution comprising such compound and water. In some such aspects, there is provided a coating comprising such compound and a second compound, wherein the second compound comprises a plurality of second ionic moieties that are complementary to the first ionic moieties. In some such aspects, the first and second compounds are silane polyelectrolytes.

In some such aspects, the compound is a polymer comprising repeat units of formula (I) and repeat units of formula (II)

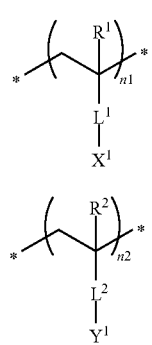

wherein the variables in formula (I) and formula (II) are as described previously.

In another aspect, there is provided a method for forming a polymer, the method comprising copolymerizing a first monomer with a second monomer, wherein: the first monomer comprises an ionic moiety; and the second monomer comprises a crosslinkable moiety or crosslinkable moiety precursor.

In some such aspects, the second monomer comprises a crosslinkable moiety precursor, and the method further comprises reacting the crosslinkable moiety precursor with a compound comprising a crosslinkable moiety and a reactive moiety. In some such aspects, the method is carried out in water. In some such aspect, the second material is a polyelectrolyte or nanoparticles, and wherein the density of the coating is dependent upon the ratio of organic to inorganic material in the coating.

These and other aspects of the invention will be apparent from the description provided herein, including the figures and claims.

DETAILED DESCRIPTION

Unless otherwise indicated, the disclosure is not limited to specific procedures, materials, or the like, as such may vary. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Thus, for example, reference to "a reactive species" includes not only a single reactive species but also a combination or mixture of two or more different reactive species.

The term "typically" is used throughout the specification to indicate common practices of the invention. The term indicates that such disclosure is exemplary, although (unless otherwise indicated) not necessary for the materials and methods of the invention. Thus, the term "typically" should be interpreted as "typically, although not necessarily." Similarly, the term "optionally" as in a material or component is optionally present indicates that the invention includes instances wherein the material or component is present, and also includes instances wherein the material or component is not present.

As used herein, a "reversible bonding moiety" is a chemical group that is capable of forming a reversible bond with a complementary chemical group, where "reversible bonds" are non-covalent bonding interactions. Reversible bonds are chemical interactions that are weaker than covalent bonds, and/or are influenced by environmental factors such as solution pH. Reversible bonding moieties include ionic moieties, hydrogen-bonding moieties, ligands and substrates, and antibodies and antigens. Reversible bonds include hydrogen bonds, ionic bonds, ligand-substrate bonds, antibody-antigen bonds, and the like. As used herein, a "reversible bonding pair" refers to a complementary pair of reversible bonding moieties. For example, an acid group (e.g. a carboxylic acid group) and a basic group (e.g. an amine group) are each reversible bonding moieties that together form a reversible bonding pair.

As used herein unless indicated otherwise, the term "ionic moieties" is meant to include moieties that are electrostatically charged at any pH (e.g., hard quaternary ammonium moieties), moieties that are electrostatically charged only at certain pH (e.g., primary, secondary, and tertiary amine moieties, carboxylic acids, etc.), and "ionizable moieties" (i.e., moieties that can be converted to an ionic moiety via a hydrolysis or substitution reaction). Examples of ionic moieties are amines (i.e. primary, secondary, tertiary, and quaternary amines), hydroxyl (including protected hydroxyl such as alkoxy and aryloxy), amides, thiol, acids (e.g., sulfinic acid), sulfinates, silanols, and carboxylic acid (including protected carboxylic acids such as carboxylates) and the like.

Throughout this specification, the terms "group" and "moiety" are synonymous and are used interchangeably.

Unless otherwise specified, use of the terms "first" and "second" as applied to the deposition solutions described herein is not meant to imply any requirement in the order of deposition of such solutions. That is, coatings of the invention may be produced by first depositing a "first deposition solution" followed by depositing a "second deposition solution," and may also be produced by first depositing a "second deposition solution" followed by depositing a "first deposition solution."

Materials
First Material and Second Material

In some embodiments, herein is described a method for coating a surface by a Layer by Layer (LbL) deposition process. The method comprises alternatingly depositing a first material and a second material on the surface. The alternating deposition may begin with either the first or the second material, and may end with either the first or the second material. Each pair of adjacent first and second materials deposited on the surface is referred to herein as a "bilayer." Any number of bilayers may be deposited as part of the methods of interest, and adjacent bilayers may be identical or may be different in composition. Additional details regarding the LbL process are provided below.

In some embodiments, the first and second materials are independently selected from polyelectrolytes (including functionalized polyelectrolytes) and nanoparticles, all of which are described in more detail below. For example, in some embodiments, the first material is a polyelectrolyte and the second material is a nanoparticles. In another embodiment the first material is a first polyelectrolyte and the second material is a second polyelectrolyte.

In some embodiments, the first material comprises first reversible bonding moieties (one or more), and the second material comprises second reversible bonding moieties (one or more). The first and second reversible bonding moieties are complementeray—i.e. they are capable of forming a reversible chemical bond. Additional details regarding the reversible bonding moieties are provided below.

In some embodiments, the first material comprises a first crosslinkable moiety. In some embodiments, the second material comprises a second crosslinkable moiety. The crosslinkable moieties are described in more detail below.

In some embodiments, the first material is water soluble and is deposited as part of an aqueous deposition solution. In some embodiments, the second material is water soluble and is deposited as part of an aqueous deposition solution.

The LbL coatings prepared according to the disclosure provide a number of advantageous properties that are described in more detail below. For example, in some embodiments, the coatings are stabilized by one or more of: (1) ionic attractive forces between any two adjacent layers (2) hydrogen bonding attractive forces between any two adjacent layers; and (3) covalent bonding between bilayers.

Polyelectrolytes

Herein is described the preparation and use of polyelectrolyte materials. As used herein, the term "polyelectrolyte" refers to a compound or material that contains multiple ionic moieties. Also, as used herein unless otherwise specified, the term "polyelectrolyte" includes compounds or materials that contains multiple functional groups that maintain electrostatic interactions, dipole-dipole interactions or hydrogen bonding (e.g., alcohols, amines, sulfur-containing groups such as thionyl, polar groups such as carbonyls, and the like). Some examples of materials that may be non-ionic (under certain conditions) but are polar include polyvinyl alcohol and polyaniline. Accordingly, polyelectrolytes comprise ionic moieties or non-ionic bonding moieties (i.e. bonding moieties selected from hydrogen bonding moieties, ligand-substrate moieties, and antibody-antigen moieties), or a combination thereof. Unless otherwise indicated, polyelectrolytes include small molecules, polymers (including synthetic and naturally occurring polymers and biomolecules), and macromolecular structures. Nanoparticles may also be polyelectrolytes; additional description of nanoparticles is provided below. Polyelectrolytes include compounds that have permanent charges (e.g., compounds containing hard quaternary ammonium moieties) as well as compounds having pH-dependent charges (e.g., compounds containing carboxylic acid or primary amine groups).

Suitable polyelectrolytes include those having a complementary coupling group capable of reacting with a coupling group on the multifunctional compound (described in more detail herein). In some embodiments, the polyelectrolytes have pendant complementary coupling groups (i.e., groups attached to, but not part of, the polymer backbone). Suitable complementary coupling groups include carboxylic acid, carboxylates, amines, amides, thiol, sulfinic acid, sulfinates, hydroxyl, alkoxy groups, aryloxy groups, silanol groups and the like. In some embodiments, the complementary coupling groups on the polyelectrolytes are acids or bases. The complementary coupling groups may be the same as the ionizable moieties described herein, in which case the multifunctional compound reacts with a portion of the ionizable moieties. Such reaction reduces the overall amount of ionizable groups on the polyelectrolyte, thus altering the ionic properties of the polyelectrolyte. Alternatively, the complementary coupling groups may be different from the ionizable moieties, in which case reaction with the multifunctional compound does not necessarily alter the ionic properties of the polyelectrolyte. The term "functionalized polyelectrolyte" as used herein refers to the product of a reaction between a polyelectrolyte and a multifunctional compound—i.e., a polyelectrolyte having a plurality of chemically attached multifunctional compounds. A functionalized polyelectrolyte is thus a polyelectrolyte with one or more crosslinking moieties. In some embodiments, however, polyelectrolytes of interest may be directly synthesized incorporating crosslinkable moieties (e.g., siloxane or silane moieties), and thus the term "polyelectrolyte" includes crosslinkable polyelectrolytes that have not been reacted with a multifunctional compound. Furthermore, unless otherwise specified, the term "polyelectrolyte" includes functionalized polyelectrolytes.

Examples of suitable polyelectrolytes include poly(acrylic acid) (PAA) and poly(allylamine) (PAH). The schemes below show grafting of glycidyl methacrylate (GMA) onto PAH and grafting of glycidoxypropyl trimethoxysilane (GPTMS) onto PAA, coupled with hydrolysis of the alkoxysilane into silanols.

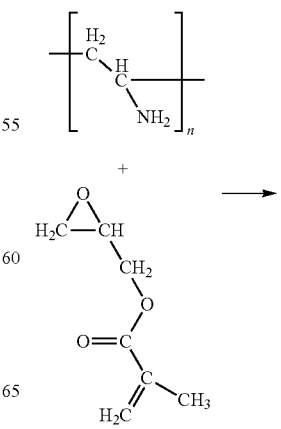

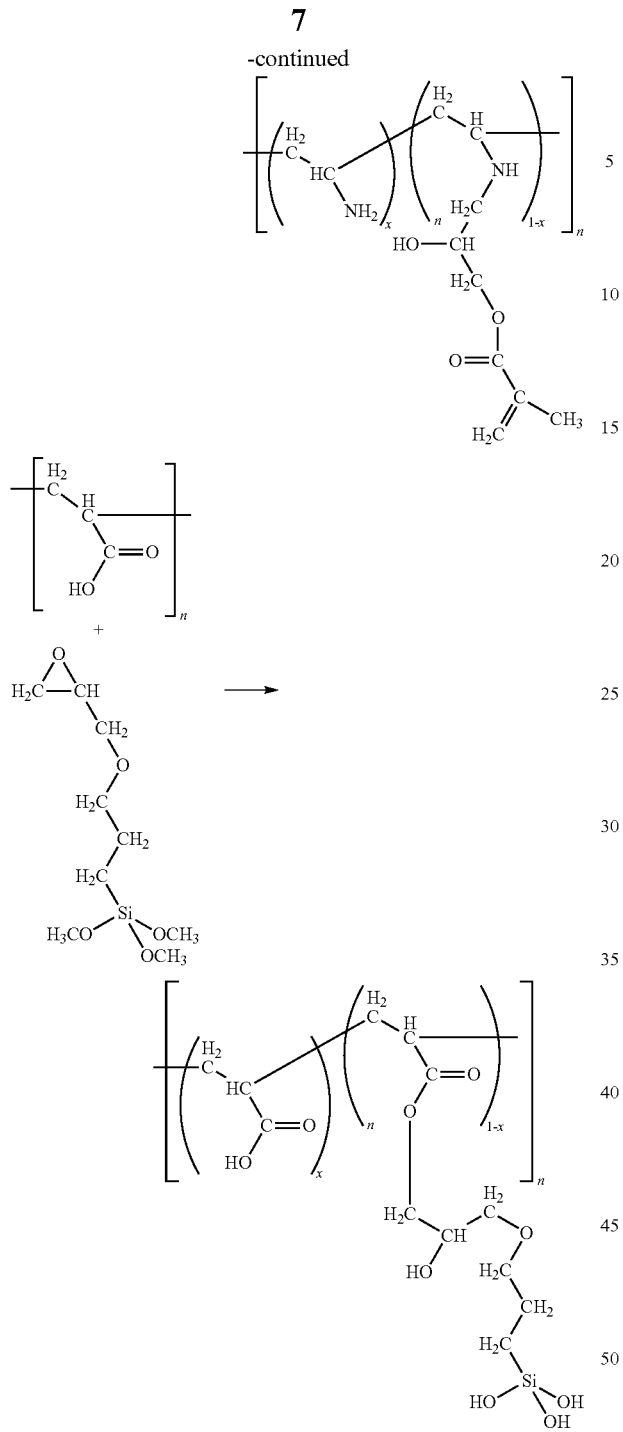

In some embodiments, the functionalized polyelectrolyte contains a plurality of moieties that have a sufficiently strong dipole moment (e.g. greater than 0.5 Debyes). In some embodiments, the functionalized polyelectrolyte contains a plurality of ionic moieties. In some embodiments, the functionalized polyelectrolyte contains a plurality of moieties capable of participating in hydrogen bonding. In some embodiments, the functionalized polyelectrolyte contains a plurality of electron donor or electron acceptor moieties.

In some embodiments, the polyelectrolyte is a polymer comprising repeat units of formula (I) and/or (II):

In formulae (I) and (II):

$n1$ and $n2$ are independently integers;

$R^1$ and $R^2$ are independently selected from H and lower alkyl;

$L^1$ and $L^2$ are linker moieties independently selected from a bond or an alkylene, arylene, or alkenylene moiety, any of which may contain one or more heteroatoms and may be unsubstituted or substituted;

$X^1$ is an ionic moiety; and $Y^1$ is a crosslinkable moiety.

For example, $n1$ and $n2$ may be integers from 0 to 100,000 or more, such as 0 to 10000, or 0 to 1000, or 0 to 100.

Also for example, $R^1$ and $R^2$ are independently selected from H, methyl, ethyl, and propyl.

Also for example, $L^1$ and $L^2$ are independently selected from a bond, methylene, ethylene, propylene, branched alkylene, cyclic alkylene, phenylene, substituted phenylene, nitrogen-containing arylene (i.e., pyridine linking groups), and the like. In some embodiments, $L^1$ and/or $L^2$ contain a carboxyl group. Thus, in some embodiments, $L^1$ and/or $L^2$ have the structure $-C(=O)-O-L^{1a}$ and/or $-C(=O)-O-L^{2a}$, respectively, wherein $L^{1a}$ and $L^{2a}$ are additional linking moieties selected from a bond or an alkylene, arylene, or alkenylene moiety, any of which may contain one or more heteroatoms and may be unsubstituted or substituted.

Also for example, $X^1$ is selected from amines, hydroxyl, amides, thiol, sulfinic acid, sulfinates, silanols, and carboxylic acid, carboxylates, and the like Also for example, $Y^1$ is selected from vinyl, alkenes, acrylates, methacrylates, silanes, siloxanes, titanates, epoxy, alkoxides, metal alkoxy precursors, phosphonates and combinations thereof. For example, $Y^1$ is selected from trialkoxysilanes, triaryloxysilanes, mixed alkoxy and aryloxy silanes, and epoxy. Also for example, $Y^1$ is selected from $-CH=CHR$, $-Si(OR)_3$, $-NR_3$, and $-SiR_3$, wherein each R is independent selected from alkyl (e.g., methyl, ethyl, propyl, butyl, etc., including branched and cyclic alkyl), aryl (e.g., phenyl, substituted phenyl, etc.), and combinations thereof.

In some embodiments, $X^1$ and $Y^1$ are the same.

For example, in some embodiments, the polyelectrolyte is a polymer comprising repeat units of formula (Ia) and/or (IIa):

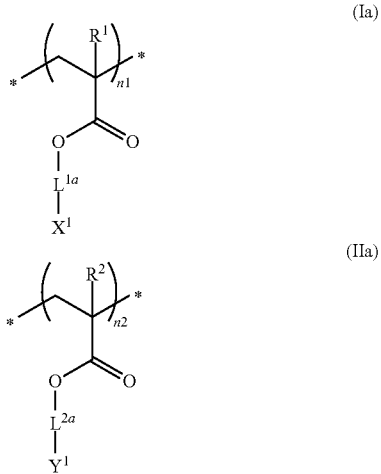

For example, in some embodiments, the polyelectrolyte comprises repeat units having a structure selected from the following:

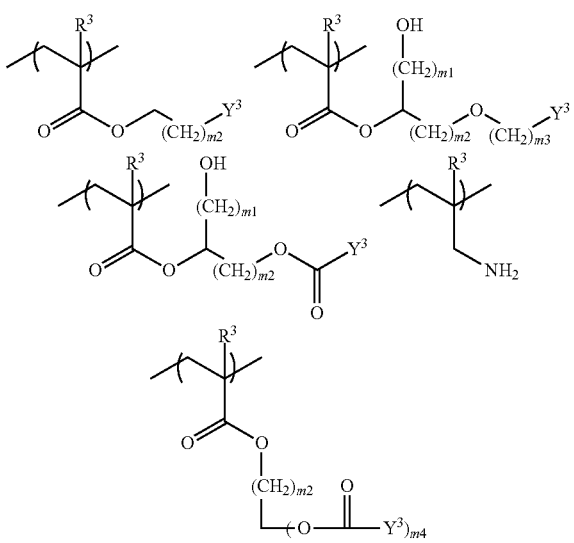

wherein:

m1, m2, and m3 are integers selected from 0, 1, 2, and 3;
m4 is an integer selected from 1, 2, and 3;
$R^3$ is selected from H and lower alkyl; and
$Y^3$ is a crosslinkable moiety as defined above for $Y^1$. Such repeat units may, for example, be prepared from the corresponding vinyl monomers.

Other synthetic and naturally occurring polymers maybe be used, including polysaccharides such as carboxymethylcellulose and chitosan, poly(amino acid)s, poly(nucleic acid)s, poly(vinyl alcohols), poly(ethylene oxides), poly(thiophenes), polyaniline, polysulfates, and the like.

The polyelectrolyte may have any suitable polymer architecture. For example, the polyelectrolyte may comprise blocks of the repeat units of formula (I) or (II) or any of the repeat units shown above, or such repeat units may be arranged randomly, or such repeat units may be arranged in a star or branched architecture. Combinations of such architectures are also possible.

In addition or in the alternative to an ethane backbone, the polyelectrolytes of interest may contain conjugation or cyclic structures throughout the backbone.

In some embodiments, the polyelectrolyte is a silicon-containing oligomer. As used herein, the term "oligomer" refers to a material that is soluble (e.g. water soluble) and has about 500 or less repeat units, or 200 or less, or 100 or less, or 50 or less, or 25 or less, or 10 or less. Such silicon-containing materials may be, for example, oligomers of a tetraalkly orthosilicate (e.g., tetraethyl orthosilicate, TEOS), a silanetriol or trialkoxysilane (e.g., aminopropyl triethoxysilane or aminopropyl silanetriol), or the like.

The polyelectrolyte may be of any molecular weight suitable for the solution deposition methods described herein. Typically, molecular weights between 100 and 1M Daltons or greater are suitable. For example, the molecular weight may be greater than 100, or greater than 1,000, or greater than 10,000, or greater than 100,000, or greater than 1M Daltons. Also for example, the molecular weight may be less than 1M, or less than 100,000, or less than 10,000, or less than 1,000, or less than 500 Daltons. In some embodiments, the polyelectrolytes are soluble in water and/or other solvents such as protic organic solvents (e.g., methanol, ethanol, etc.).

Multifunctional Compound

In some embodiments, the polyelectrolytes of the invention are functionalized with crosslinkable reactive groups via reaction with a multifunctional compound. In some embodiments, the multifunctional compound contains one or more of a coupling group suitable for reaction with the polyelectrolyte and one or more of a crosslinking moiety. In some embodiments the coupling group and crosslinking moiety are different groups, and furthermore are orthogonal in their reactivity with the polyelectrolyte. For example, the coupling group is reactive with the polyelectrolyte and the crosslinking moiety is not reactive with the polyelectrolyte. The multifunctional compound may contain more than one functional group, such as 2, 3, 4, 5, 10, or more than 10 (e.g., between 10 and 100) functional groups. In some cases, some such additional functional groups will be identical to the coupling group while other such additional functional groups will be identical to the crosslinking moiety.

Groups suitable as the coupling group are those groups that can undergo a reaction with the polyelectrolyte such that the multifunctional compound becomes attached to the polyelectrolyte. As described herein, the polyelectrolyte contains reactive functional groups such as pendant nucleophilic groups. Accordingly, reactive electrophilic groups are one type of group suitable as coupling groups. In some embodiments, epoxy groups are suitable coupling groups. The strained epoxy ring of an epoxide compound is susceptible to nucleophilic attack by various groups on the polyelectrolytes described herein. In some embodiments, coupling groups can be those that participate in carbodiimide-assisted esterification. In some embodiments, coupling groups can be those that participate in alcohol and acid anhydride reactions.

In some embodiments, the coupling group is reactive with the ionizable moieties of the polyelectrolyte, as mentioned above. In other embodiments, the coupling group is not reactive with the ionizable moieties of the polyelectrolyte, but is reactive with a different functional group (i.e., a non-ionizable group) present on the polyelectrolyte.

Groups suitable as the crosslinking moiety are those groups that can undergo a polymerization or crosslinking reaction. Because the crosslinking moieties are attached to the polyelectrolyte, such polymerization reaction forms a crosslinked network comprising the polyelectrolyte. In some embodiments the polymerization reaction is the result of a condensation reaction. The crosslinking moieties may be relatively non-polar, such that they are typically found on water insoluble compounds, or they may be relatively reactive with water or other polar protic solvents. Examples of groups suitable as crosslinkable moieties in the invention include vinyl, alkenes, acrylates, methacrylates, silanes, siloxanes titanates, epoxy, alkoxides and precursors thereof (e.g., metal alkoxy precursors), phosphonates and combinations thereof. Sol-gel precursor moieties (e.g., siloxanes) are suitable as crosslinkable moieties.

For example, in some embodiments, acrylate compounds are suitable for preparing the functionalized polyelectrolytes of the invention. Crosslinking (i.e., polymerization) of the acrylate groups can be initiated either thermally or upon exposure to ultraviolet light. One example of a suitable acrylate compound is glycidyl methacrylate (GMA), which contains an epoxy ring as coupling group and a vinyl group as second functional group. Glycidyl methacrylate shows very little solubility in water (<2 g/100 mL of water at 20 degrees Celsius). The strained epoxy ring of GMA is susceptible to nucleophilic attack by various groups on some commercially available polyelectrolytes such as those described herein. In some cases, the ionic group of the polyelectrolye is itself capable of reaction with the epoxy ring of the GMA. Such reactions incorporate GMA as pendant groups of the polyectrolyte, thereby allowing the carbon-carbon double bonds of the second functional groups to react in a subsequent crosslinking step. In another example, the multifunctional compound contains more than one acrylate group. For example, an epoxy-functionalized triacrylates and diacrylates are suitable multifunctional compounds.

In some embodiments, siloxane compounds are suitable for preparing the functionalized polyelectrolytes of the invention. For example, compounds containing monoalkoxysilane, dialkoxysilane, trialkoxysilane, triaryloxysilane, and mixed alkoxy/aryloxy silane groups are suitable. Compounds containing mixed alkyl/alkoxy and aryl/aryloxy silane groups are also suitable provided that such groups are capable of crosslinking via the reactions described herein. One example of a siloxane-based multifunctional compound suitable for the invention is glycidoxypropyl trimethoxysilane (GPTMS), which exhibits a water solubility of about 17 g/L at 25 degrees Celsius.

In some embodiments, titanates are suitable for the multifunctional compounds of the invention. For example, glycidyl ether functionalized titanates and vinyl-functionalized titanates are suitable.

In some embodiments, the multifunctional compound has a plurality of a single type of reactive group. For example, pentaerythritol glycidyl ether (GPET) has four reactive epoxy groups. One or more of the epoxy groups can be used to connect the molecule to the polyelectrolyte, provided that at least one of the epoxy groups remains unreacted in order to function as the crosslinking moiety (i.e., to remain available for subsequent crosslinking reactions).

Nanoparticles

As described herein, the LbL process involves formation of bilayers by alternate deposition of first and second materials. In some embodiments, one of the materials is a polyelectrolyte such as any of those described herein, and the other material is a nanoparticle, a specific type of polyelectrolyte. Suitable nanoparticles include those that comprise positive or negative surface charges, or possess hydrogen bonding donors and acceptors. Suitable nanoparticles include those that possess a functionality which enables it to participate in a complementary interaction. Suitable nanoparticles also include those that possess a crosslinkable moiety such as any of those described herein for the first material.

In some embodiments where nanoparticles are used, the nanoparticles may be modified by reaction with the multifunctional compound. In this manner crosslinkable groups are incorporated onto the nanoparticles. Typically, such incorporation is carried out by reacting the first reactive group of the multifunctional compound with a functional group residing on the surface of the nanoparticles. For example, silicon dioxide nanoparticles or core-shell nanoparticles with $SiO_2$ on the surface can be functionalized via a trialkoxy silane group. For example, methacrylpropyl trimethoxysilane (MPTMS) or GPTMS can be used to create acrylate or epoxy functionalized $SiO_2$ nanoparticles. In some embodiments, hydroxyl groups on the surface of nanoparticles can be used to attach the multifunctional compound. For example, multifunctional compounds containing epoxy groups (e.g., GMA) can be reacted with surface hydroxyl groups to provide vinyl-functionalized nanoparticles.

Furthermore, nanoparticles can be modified by reaction with a polyelectrolyte. For example, PAA-GPTMS can be used to attach PAA onto the surface of $SiO_2$ nanoparticles, wherein residual trimethoxysilanes are available for further reaction.

Examples of suitable nanoparticles include metal oxide nanoparticles such as silicon dioxide, titanium dioxide, cerium dioxide, zinc oxide, aluminum oxide, tin oxide, or functionalized carbon nanoparticles such as carbon nanotubes, graphene, fullerenes, clay platelets, coated nanoparticles and metallic nanoparticles such as gold silver and copper. In the case of epoxy functionalized silica nanoparticles, the epoxy ring is highly reactive to amines, acids, and alkoxy groups, and can therefore react with a coupling group of a multifunctional compound to provide crosslinkable nanoparticles. Similarly, gold nanoparticles that possess a carboxylic acid functionality, through thiol chemistry, can be tethered to silica in this manner.

Solvents

As mentioned elsewhere herein, in some embodiments the solvent for carrying out the functionalization reactions and the LbL deposition processes is water. Other solvents may be used in addition or as an alternative to water, including polar protic solvents such as methanol, ethanol, propanol, etc. Polar aprotic solvents may also be used, including ethers, DMAC and DMSO. Nonprotic, nonpolar solvents may also be used such as benzene or toluene.

In some embodiments the polyelectrolytes are water soluble. In some embodiments, the multifunctional compound is sparingly water soluble or water insoluble, but the functionalized polyelectrolyte is water soluble. In some embodiments, the polyelectrolytes of interest are prepared in an organic solvent, isolated from the solvent, and then redissolved in water to form a deposition solution. As used herein, the term "sparingly soluble" refers to a material with a solubility of about 100 g/L or less, 50 g/L or less, 20 g/L or less, or 10 g/L or less, or 1 g/L or less, or 0.5 g/L or less, or 0.1 g/L or less.

Processes

Layer-by-Layer (LbL) assembly such as spray assembly processes can be used for the deposition of nanostructured thin films from polyionic molecules, particularly in accordance with the compounds described herein. Generally, the LbL process uses complementary interactions between molecules, such as electrostatic, covalent or hydrogen bonding interactions, to assemble films one molecular layer at a time. Using the example of electrostatic LbL, the process involves exposing a charged surface or a substrate (e.g., a substrate possessing native or applied negative surface charges) to a first solution containing a charged molecule (e.g., a positively charged polyelectrolyte). The molecules of the solution have an affinity for the surface due to the presence of opposite surface charges. Molecules will continually assemble on the surface, resulting in film growth, until the charges available for binding are saturated, whereupon the surface undergoes a charge reversal, preventing further positively charged molecules from being adsorbed to the growing film. Following the saturation of the surface, a rinse solution can be applied to the film, removing residual molecules that may be present and weakly interacting with the absorbed film. Thus, the growth of the layer is self-limited. A subsequent exposure of a second solution containing oppositely charged molecules (e.g., a negatively charged polyelectrolyte), results in adsorption of the molecule from the second solution to the now positively charged surface. As with the first layer, absorption continues until saturation occurs, and another charge reversal occurs. Again, a rinse solution may be applied after the layer of negatively charged polyelectrolyte is completed. In spray LbL methods, the first, second, and rinse solutions just described are applied to the substrate as aerosols (i.e., as fine mists of solution expelled from nozzles). In some embodiments substrates are held in a vertical position to allow excess solution to drain from the film via gravity.

In some embodiments the LbL process involves formation of bilayers by alternate deposition of charged species. For example, in some embodiments, one of the charged species is a polyelectrolyte having negatively charged groups, and the other charged species is a polyelectrolyte having positively charged groups.

The film resulting from the above-described process comprises a layer of positively charged material and a layer of negatively charged material and is referred to herein as a bilayer. The bilayer is the building block of an LbL film. The nature of the self-limiting process ensures control of film thickness and uniformity. The thickness of the bilayer can typically be varied through changes in solution properties such as pH or salt concentration. Any number of bilayers can be deposited to produce a film of any desired thickness and material composition. Thus, alternating bilayers can be prepared from different materials. For example, a film wherein each bilayer is composed of two materials that both have crosslinkable groups will have the highest crosslinking density (i.e. after performing the crosslinking reaction). To decrease the crosslink density of the final films, bilayers can be inserted that contain no crosslinkable groups, crosslinkable groups in only one of the two materials, or a functionalized polyelectrolyte with a lower density of crosslinkable groups.

A variety of molecules, solvents and methods of applications are suitable for creating films with varied functionalities via LbL. In some embodiments of the invention, the functionalized polyelectrolytes described herein are used in one of the solutions used to form LbL films. In such embodiments, either unfunctionalized polyelectrolytes (i.e., those that do not have incorporated reactive crosslinkable groups) or nanoparticles are used in the second solution used to form LbL films. In other embodiments, the functionalized polyelectrolytes described herein are used in both of the solutions used in forming LbL films. Methods for preparing the functionalized polyelectrolytes and for preparing LbL films using such materials are described in more detail below.

Formation of Functionalized Polyelectrolytes

As described herein, in some embodiments the functionalized polyelectrolytes of the invention are prepared from a polyelectrolyte (i.e., a functionalized polyelectrolyte precursor) and a multifunctional compound. For example, the functionalized polyelectrolytes of the invention are prepared directly by reacting the polyelectrolyte with the multifunctional compound. In some embodiments, it may be necessary to use protecting group chemistry to prepare the functionalized polyelectrolyte. In some embodiments, a copolymer is synthesized that is used to prepare a functional polyelectrolyte. This can be done, for example, by copolymerizing a monomer having an ionic moiety with a monomer having a complementary coupling group. The resulting copolymer polyelectrolyte can be reacted with the multifunctional compound to form a functionalized polyelectrolyte.

Even after reaction of the polyelectrolyte with the multifunctional compound, however, the polyelectrolyte must maintain some electrostatic charges, or other functionality that participates in reversible bonding, in order to be deposited in thin films using the LbL technique. Accordingly, in embodiments wherein the charged group of the functionalized polyelectrolyte is reacted directly with the multifunctional compound, the amount of multifunctional compound used in the reaction is limited such that a plurality of charged groups will remain in the functionalized polyelectrolyte after the reaction. For example, in functionalizing PAA with GMA, to ensure that some acrylic acid groups remain after the functionalization reaction, the number of acrylic acid groups present from the PAA polymer will be in stoichiometric excess of the number of GMA groups used in the reaction. Alternatively, the functionalization reaction can be carried out using an excess of multifunctional compound, provided that the reaction is stopped prior to completion.

From the preceding paragraphs, however, it will be evident that in some embodiments, the ionic properties of the functionalized polyelectrolyte can be tailored via the reaction of the polyelectrolyte with the multifunctional compound. Where the reaction is between the ionizable groups on the polyelectrolyte and a functional group on the multifunctional compound, such reaction creates a covalent bond between the two compounds and in some embodiments converts the ionizable group to a non-ionizable group. Thus, the ionic properties of the functionalized polyelectrolyte can be tailored by adjusting the extent of reaction between the polyelectrolyte and the multifunctional compound. Over-functionalization or under-functionalization, however, may lead to undesired results. For example, in some embodiments, reaction of most or all of the ionizable groups on the polyelectrolyte reduces or eliminates the polyelectrolyte's ability to be electrostatically charged. In such a case ("over-functionalization"), the polyelectrolyte is less capable or incapable of forming and supporting layers in the LbL process. Furthermore, the polyelectrolyte's solubility in water may be insufficient in order to carry out the LbL process. On the other hand, insufficient conversion of the ionizable groups in the reaction with the multifunctional compound ("under-functionalization") provides a functionalized polyelectrolyte that does not have a sufficient number of crosslinking groups for subsequent crosslinking reactions. Whether a polyelectrolyte has been over-functionalized or under-functionalized will be apparent from the properties of the resulting functionalized polyelectrolyte. However it is appreciated that the ability to control the degree of functionalization can be utilized to control the assembly process and thus the properties of the resulting film.

In some embodiments, the multifunctional compound reacts with a functional group on the polyelectrolyte that does not supply charge to the polyelectrolyte. In such cases, an excess of the multifunctional reagent may be used to ensure complete incorporation. The charge-carrying components of the polyelectrolyte will still remain and the functionalized polyelectrolyte will remain suitable for use in LbL.

In some embodiments, polyelectrolytes suitable for the invention have pH dependent degrees of ionization. Thus, the degree of functionalization with the multifunctional compound will impact the dissociation constants of the resulting functionalized polyelectrolyte, and will impact the behavior and film-forming properties of the polyelectrolyte. Such changes may be taken into account during the LbL film-forming process.

It is possible to control various aspects of the resulting films by controlling the degree of functionalization of the polyelectrolytes (i.e., the number of reactive groups on a given molecule or nanoparticle). For example, it is possible to control the degree of crosslinking of the final films. It is also possible to control the degree of water solubility of the functionalized polyelectrolyte, as well as the extent that such polymers are miscibility with other polymers. It is also possible to control the porosity and morphology of the resulting film.

The functionalization reaction may be performed in aqueous solvent; in such a case, minimal purification of the product is necessary prior to thin film processing by layer-by-layer deposition. The reaction may be performed under acidic or basic conditions, as needed. For example, for PAA, in which the weakly nucleophilic carboxylic acid groups are the reactive moieties, acidic conditions are chosen, to maximize the susceptibility of epoxy ring to nucleophilic attack. Under these conditions (i.e., acidic conditions), alkoxy groups on siloxane compounds (e.g., when GPTMS is used as the multifunctional compound) are hydrolyzed to form pendant silanols. Alternatively, for PAH, which bears the strongly nucleophilic primary amine group, basic conditions are chosen, to ensure deprotonation of the amine. Under these conditions, there is likely competition from free hydroxide ions for epoxy ring attack.

In some embodiments, the coupling group of the multifunctional compound and the complementary coupling group of the first polyelectrolyte are both non-ionic groups and are capable of reacting to form a covalent bond. An example is reaction between a hydroxyl group and a protonated carboxylic acid group.

In some embodiments, the coupling group of the multifunctional compound and the complementary coupling group of the first polyelectrolyte are both ionic groups and are capable of reacting to form an ionic bond. An example is reaction between an acid group (e.g. carboxylic acid) and a base group (e.g., a quaternary amine).

In some embodiments, one of the coupling group of the multifunctional compound and the complementary coupling group of the first polyelectrolyte is an ionic group and the other of the coupling group of the multifunctional compound and the complementary coupling group of the first polyelectrolyte is a non-ionic group, and the two groups are capable of reacting to form a covalent bond. An example is reaction between an amine group and a glycidyl group.

The formation of functionalized polyelectrolytes is carried out under conditions suitable for the type of reaction that occurs between the polyelectrolyte and the multifunctional compound. In some embodiments the temperature can be increased in order to speed the reaction rate. In some embodiments, the reaction solution is diluted down with additional solvent (particularly where water is solvent) and used without further preparation in the preparation of thin films as described herein. In such instances, concentrations of polyelectrolyte that are less than 5%, 1%, 0.5%, 0.1%, 0.05%, or 0.01% by weight are suitable for LbL processes. Alternatively, the reaction solution may be purified to remove small molecule contaminants or salts which can impact the film quality during layer by layer deposition, for example, via dialysis.

In some embodiments, the functionalized polyelectrolytes of the invention are suitable to be further reacted to other polyelectrolytes. Furthermore, the functionalized polyelectrolytes may be more likely to complex with different molecules. For example the presence of a GMA functionalized polyelectrolyte may exhibit higher miscibility with other acrylate functionalized polymers, which can improve the efficiency of thin film assembly. For example, poly(dimethyldiallylammonium chloride) (PDAC) and PAA have limited miscibility, which prevents film assembly. An acrylate functionalized PDAC and GMA functionalized PAA are miscible over a broader range of conditions compared with the unfunctionalized versions. Improved miscibility in this sense also improves the ability of the materials to electrostatically assemble in the LbL deposition process.

In some embodiments the functionalized polyelectrolyte is soluble in aqueous solutions. Additionally or in the alternatively, in some embodiments the functionalized polyelectrolyte is soluble in other solvents such as those described herein.

In some embodiments, the functionalized polyelectrolyte comprises silane or siloxane functionalities. In some such embodiments the polyelectrolyte is a copolymers, containing silane or siloxane moieties and ionic moieties. In some such embodiments the polyelectrolyte is a silane or siloxane polymer, where the silane or siloxane moieties function as both ionic moiety and crosslinkable moiety.

Examples of silane groups are alkyl silanes (trimethyl silane, triethyl silane, methyl diethyl silane, etc.), aryl silanes (triphenyl silane, etc.), halo silanes (trichlorosilane, etc.), and combinations thereof (e.g., mixed alkyl and aryl silanes, etc.). Examples of siloxane groups are alkyl siloxanes (trimethoxy silane, triethoxyl silane, methyl diethyl siloxane, etc.), aryl siloxanes (triphenyl siloxane, etc.), and combinations thereof (e.g., mixed alkyl and aryl siloxanes, etc.).

As discussed herein, some embodiments involve forming a polyelectrolyte polymer, the method comprising copolymerizing a first monomer with a second monomer. The first monomer comprises an ionic moiety, and the second monomer comprises a crosslinkable moiety or a complementary coupling moiety (for reaction with the multifunctional compound, in order to incorporate a crosslinkable moiety). In some such embodiments, such as with silane monomers, the first and second monomers may be the same. In such cases, for example, the silane groups function as ionic moieties and also function as crosslinkable moieties. Thus, the resulting polyelectrolyte is a silane oligomer or polymer, and is not necessarily a copolymer of different monomers. In other embodiments, the first and second monomers are different. In some such embodiments, silane functionality can be added to the polyelectrolyte via reaction of the polyelectrolyte copolymer with a silane-containing multifunctional compound.

The silane and siloxane functionality imparts significant protection against mechanical and exposure degradation mechanisms for the films prepared using such compounds.

Preparation of Thin Films

The spray Layer-by-Layer process is described herein, and is used in conjunction with the functionalized polyelectrolytes described herein. Typically, the spray LbL process will involve three solutions: a first solution containing a cationic species, a second solution containing an anionic species, and a rinse solution. The first and second solutions may alternatively be referred to herein as "deposition solutions." Functionalized polyelectrolytes may be present in both of the first and second solutions. Alternatively, one of the solutions may comprise a functionalized polyelectrolyte and one of the solutions may comprise a non-functionalized polyelectrolyte or a nanoparticle as previously described.

In some embodiments, it may be desirable to include a polymerization initiator in one or both of the deposition solutions, and/or in the rinse solution. Alternatively or in addition, the initiator can be applied in a step following film formation. The initiator is of the type that is suitable in light of the particular multifunctional compound incorporated into the film-forming materials (e.g., a radical initiator for where the multifunctional compound comprises vinyl moieties). Also, typically, the initiator is one that must be triggered by some condition (e.g., increased temperature) before it initiates polymerization. Examples of suitable initiators include azo compounds (e.g., azobisisobutyronitrile) and organic peroxides (e.g., di-t-butylperoxide). In some cases, where a polymerization initiator is used that is relatively unstable at room temperature, it may be necessary to carry out the LbL film-forming process using solutions at reduced temperature.

In some embodiments, the solutions used for LbL deposition according to the invention have water as the solvent. Where necessary or desired, other solvents may be used in addition or in place of water. In some embodiments, the pH of the spray-ready solution is adjusted such that the degree of ionization and corresponding assembly conditions are suitable for LbL deposition. In some embodiments, the salt concentration of the spray-ready solutions is adjusted to shield electrostatic interactions to introduce porosity into the film (i.e., to change the morphology of the film).

Any number of bilayers may be deposited to form the thin films of the invention. In some embodiments, 5, 10, 15, 20, 25, 30, 35, or more than 35 bilayers are deposited.

Crosslinking

Once the LbL film is prepared, the reactive groups present on the functionalized polyelectrolyte can be induced to react with one another to form a crosslinked network. The crosslinking reaction can be initiated in a variety of ways, including chemical, environmental, thermal, or radiative methods.

In some embodiments, exposure of the films to heat or electromagnetic radiation (e.g., UV light) is suitable to initiate crosslinking. For example, when the crosslinkable groups are vinyl groups (e.g., acrylate or methacrylate groups), UV radiation is an effective method for initiating crosslinking. In some embodiments, chemical stimuli are used to induce crosslinking. For example, exposure of the films to an acidic or basic environment may be used to induce crosslinking. Alternatively, it is noted that the pH of the sprayed-on deposition solution changes as the solvent evaporates. Accordingly, increased or decreased pH triggered by such evaporation can be used to trigger the crosslinking reaction and gelation of the film. Acid/base catalyzed gelation is particularly suitable, for example, for silane-functionalized films. In some embodiments, environmental stimuli are used to induce crosslinking. For example, exposure to an oxygen plasma environment may be used to generate polymerization-initiating radical species. Alternatively, changes in solution concentration (e.g., by evaporation of solvent) can be used to crosslink certain functionalized polyelectrolytes such as silane-containing polyelectrolytes. In some embodiments, exposure to combinations of crosslinking stimuli, are used. For example, a film can be exposed to heat, followed by exposure to UV light.

In some embodiments, as described herein, a polymerization initiator is included in one or both of the deposition solutions, or maybe applied in a separate process. In such instances, post-deposition crosslinking is carried out by inducing the initiator to initiate crosslinking within the film. For example, initiation can be induced in some embodiments by the application of heat to the film.

Where siloxane groups or other sol-gel precursors are used in the multifunctional compound, heating of the LbL film will induce condensation of the sol-gel precursor and formation of a crosslinked network. Similarly, where acrylate or other vinyl groups are used in the multifunctional compound, application of heat or UV light will induce reaction or polymerization of the vinyl groups and formation of a crosslinked network.

In some embodiments, functionalized polyelectrolytes are used in both solutions used to build the bilayers of the LbL films. In such embodiments, subsequent crosslinking results in a completely crosslinked film—i.e., crosslinks form within each of the layers as well as between each of the layers. Completely crosslinked films may also result when one of the solutions comprises a functionalized polyelectrolyte and the other solution comprises nanoparticles.

In some embodiments, functionalized polyelectrolytes are used in only one of the solutions used to build the LbL films. In such embodiments, to the extent that discreet layers remain after formation of the thin films, crosslinkable groups are present only in alternating layers. Accordingly, subsequent crosslinking may not result in a completely crosslinked film. Crosslinks will form within layers containing functionalized polyelectrolytes, and, depending on factors such as the thickness of the layers and the discreetness of the layers, crosslinks may form between layers containing functionalized polyelectrolyte (i.e., across alternating layers). Without wishing to be bound by theory, it is believed that this results in a semi-interpenetrating network, with a non-crosslinked polymer trapped within a continuous crosslinked network of a second material.

In some embodiments, the amount of polymer present in the layers prepared according to the disclosure has a significant effect on mechanical and optical properties of the resulting coating. For example, the increased presence of polyelectrolyte creates a more co-continuous network leading to stronger mechanical properties. Furthermore, the increased presence of polyelectrolyte corresponds to a decrease in the amount of void space within the coating. Such void space may be filled with air or an inert gas or a liquid. Increasing the polyelectrolyte content thus alters the refractive index of the film and the alters the mechanical properties due to the reduction of void space.

Similarly, an increase in the content of polyelectrolyte can result in a higher crosslink density in the resulting film. The same result can be obtained by increasing the density of crosslinking moieties on the deposition materials. A higher crosslinking density can result in higher organic content in the resulting film, and this can provide higher mechanical strength, higher refractive index, etc. Without wishing to be bound by theory, it is believed that crosslinking moieties tend to fill interstitial spaces (i.e. between nanoparticles or other deposition materials) in the deposited films, as such moieties have less electrostatic charge compared with the ionic moieties.

Even when heat is not necessary to initiate reaction of the crosslinkable groups, the crosslinking reaction can be carried under conditions of elevated temperature in order to increase the speed of reaction.

The methods and materials described herein are not limited to films prepared using LbL techniques or to films using the specific materials described herein. Such materials offer controlled solubility in water and/or miscibility with other molecular components, and these advantages are applicable to methods beyond LbL film formation. Other film-forming techniques such as Langmuir Blodgett methods and the like can be carried out using the functionalized polyelectrolytes described herein. Furthermore, other methods that employ nanoparticles or that require crosslinking of materials can benefit from the use of the materials described herein.

Further aspects of the disclosure include the following. In some aspects, there is provided methods and materials for incorporating chemical crosslinking groups that are typically water insoluble, insufficiently water soluble, or insufficiently ionogenic in the LbL (and similar) film-forming process. Such groups are chemically incorporated into water soluble polymers and nanoparticles used to build the LbL film. Incorporation as described herein imparts water solubility to the crosslinking groups, and enables a broad range of crosslinking chemistries to be used to enhance film durability and perform subsequent chemistry to the films. Furthermore, herein are described new classes of multifunctional polyelectrolytes that have a variety of uses, such as in the preparation of LbL deposited films and the like.

In one aspect, there is provided materials and methods for adding chemical functionalities, non-water soluble functionalities, reactive chemical functionalities, and/or ionic functionalities onto polyelectrolyte species.

In another aspect, there is provided methods of increasing the mechanical and environmental wear resistance of films assembled from the materials disclosed herein through the formation of crosslinks. In some embodiments, the crosslinks are formed via a polymerization reaction of crosslinkable groups attached to polyelectrolytes. In some embodiments the polymerization reaction is carried out after formation of a multi-layer film.

In another aspect of the invention, there is provided the use of water soluble polyelectrolytes species as a template for providing water solubility whereupon reactive molecules are attached in a controllable fashion.

In some aspects, there is provided herein a method for forming a coating solution, the method comprising reacting a polyelectrolyte with a multifunctional compound in a solvent to form a functionalized polyelectrolyte, wherein the functionalized polyelectrolyte is water soluble and comprises crosslinkable moieties. Furthermore, in some embodiments, the functionalized polyelectrolyte is electrostatically charged. Alternatively or in addition, the functionalized polyelectrolyte comprises a plurality of moieties that have a significant dipole moment.

In some aspects, there is provided herein a method for producing a thin film, the method comprising: (a) depositing on a surface a first coating solution comprising a first functionalized polyelectrolyte, wherein the first functionalized polyelectrolyte is water soluble, comprises first reversible bonding moieties, and further comprises chemically attached crosslinkable groups; (b) depositing on the substrate a second coating solution comprising a second material, wherein the second material comprises second reversible bonding moieties that are complementary to the first reversible bonding moieties. The second ionic material optionally further comprises chemically attached crosslinkable groups. For example, in some embodiments the first and second reversible bonding moieties are oppositely charged ionic moieties, and are capable of forming an ionic bonding pair. Also for example, in some embodiments, the first and second reversible bonding moieties are a ligand and a substrate, where one is an electron acceptor and the other is an electron donor, and wherein they are capable of forming a ligand-substrate bonding pair. Also for example, in some embodiments, the first and second reversible bonding moieties are hydrogen-bonding moieties, where one is a hydrogen-donating moiety and one is a hydrogen-accepting moiety, and wherein the pair is capable of forming a hydrogen bonding pair. Also for example, in some embodiments, the first and second reversible bonding moieties are an antibody and an antigen, wherein the pair is capable of forming an antibody-antigen bonding pair.

In some aspects, there is provided herein a method for producing a thin film, the method comprising: (a) depositing on a surface a first coating solution comprising a first ionic material, wherein the first ionic material is water soluble and comprises chemically attached crosslinkable groups; (b) depositing on the substrate a second coating solution comprising a second ionic material, wherein the second ionic material is charged oppositely from the first ionic material. The second ionic material optionally further comprises chemically attached crosslinkable groups.

In some aspects, there is provided herein a method for producing a thin film, the method comprising depositing on a surface a plurality of bilayers, wherein each bilayer is prepared by depositing a first coating solution and a second coating solution. In some embodiments, the first coating solution comprises a water-soluble polyelectrolyte comprising reactive crosslinkable groups. In some embodiments, the second coating solution comprises a water-soluble polyelectrolyte comprising reactive crosslinkable groups. In some embodiments, the first and the second coating solutions both comprise water-soluble polyelectrolytes comprising reactive crosslinkable groups.

Furthermore, in some aspects, there is provided a method for chemically attaching functional groups onto a polyelectrolyte. In some embodiments, the functional groups are non-ionogenic and provides the ability to control the assembly conditions without altering pH. In some embodiments, the chemical attachment is a covalent bond, and in some embodiments, the chemical attachment is an ionic bond. Also in some embodiments, the polyelectrolyte is a polyionic species containing ionic groups consisting of carboxylates, amines, alcohols, hydroxys or sulfonates, and others as described herein. Also in some embodiments, the polyelectrolyte contains hydrogen bonding donors or acceptors consisting of hydroxys, alcohols or ethers. Also in some embodiments, the polyelectrolyte comprises ionic groups and/or hydrogen bonding groups that serve as bonding sites for attaching a multifunctional compound. Also in some embodiments, the percentage of ionic or hydrogen bonding groups which receive and bond to the multifunctional compound can be controlled. Also in some embodiments, the multifunctional compound comprises a functional group selected from an acrylate, silane, vinyl, or epoxy groups, or others as described herein. Materials adapted to such methods are also within the scope of the invention. For example, in some embodiments, the multifunctional compound contains a reactive chemical group (also referred to herein as a coupling group), wherein the reactive chemical group selectively reacts with carboxylates, amines, hydroxys, or sulfonates. Also in some embodiments, the reactive chemical group is a glicydyl group. Also in some embodiments, the multifunctional group contains multiple reactive sites. Also in some embodiments, the polyelectrolyte is a charged polymer, charged monomer, charged nanoparticle, charged dendrimer, a copolymer containing charged ionic groups, DNA, RNA, protein, or a charged micelle. Also in some embodiments, the polyelectrolyte is soluble in a solvent. Also in some embodiments, the solvent is water. Also in some embodiments, the solvent is water mixed with electrolytes set to a specific pH. Also in some embodiments, the solvent is a mixture of water, solutes and other solvents. Also in some embodiments, the solvent is a mixture of water and ethanol. Also in some embodiments, the multifunctional compound contains crosslinkable groups that can be chemically modified. Also in some embodiments, the chemical modification is induced by thermal, radiative, environmental, or chemical stimulus. Also in some embodiments, the stimulus is UV radiation. Also in some embodiments, the chemical modification results in the formation of a covalent bond. Also in some embodiments, a plurality of covalent bonds are formed, such that the result of the chemical modification is the formation of a crosslinked film. Also in some embodiments, the coating exhibits stronger mechanical durability. Also in some embodiments, the coating can be swelled. Also in some embodiments, the coating maintains some functional property. Also in some embodiments, the functional property is optical, wettability, responsiveness, reactivity or conductivity. Also in some embodiments, the modified polyelectrolyte species is deposited using a layer by layer process, Langmuir Blodgett film formation, spin coating, spray coating, dip coating, gravure coating, rod-coating, curtain-coating, electrostatic deposition. Also in some embodiments, the modified polyelectrolyte species is deposited using a spray layer by layer process. Also in some embodiments, the invention involves preparing a thin film by depositing a silane modified polymer as one layer and a polycation as another layer in a bilayer structure.

In the context of thin films assembled by layer-by-layer deposition processes, chemical crosslinking adds another level of reinforcement to enhance the mechanical properties of the film. It ensures that covalent bonds, and not just entanglements and ionic interactions, are responsible for holding the film together. Also, where adsorbed moisture has pushed the polymers in the film above the glass transition temperature, crosslinking limits the ability of the film to flow or irreversibly deform. Furthermore, crosslinking prevents solubilization when exposed to certain solvents such as high ionic strength water. In some embodiments, the present invention provides polymers suitable for LbL deposition (and other methods of deposition) that can be induced to crosslink during the deposition process itself.

In some embodiments, crosslinkable polymers are prepared which can be deposited by a layer-by-layer process and are modified to contain a polyelectrolyte with pendant groups containing reactive unsaturated carbon-carbon double bonds. The reactive double bonds can be induced to crosslink by a variety of methods such as exposure to UV or a radical initiator.

In some embodiments, crosslinkable polymers (i.e., sol-gel precursors) are prepared which can be deposited by a layer-by-layer process and are modified to contain a polyelectrolyte with pendant groups containing reactive silane groups. Alkoxysilanes are sol-gel precursors which can condense to form silica networks following hydrolysis of the alkoxy substituent groups.

In one aspect the disclosure provides a method for producing a coating on a surface, the method comprising depositing a first polyelectrolyte, wherein the first polyelectrolyte comprises first reversible bonding moieties and first crosslinkable moieties. In some such aspects, the first reversible bonding moieties are selected from ionic moieties, hydrogen-bonding moieties, ligand-substrate moieties, and antibody-antigen moieties. In some such aspects the first polyelectrolyte is water soluble and is part of a first deposition solution. In some such aspects the first crosslinkable moieties are chemically attached to the first polyelectrolyte and are selected from vinyl, alkenes, acrylates, silanes, titanates, epoxy, alkoxides, and combinations thereof. In some such aspects the method further comprises depositing a second material, wherein the second material comprises second reversible bonding moieties. In some such aspects the second material is selected from a polyelectrolyte, a second polyelectrolyte, and nanoparticles. In some such aspects the second reversible bonding moieties are complementary to the first reversible bonding moeties. In some such aspects the first and second reversible bonding moieties are ionic moieties, and wherein the first reversible bonding moieties are oppositely charged from the second reversible bonding moieties. In some such aspects the second material is water soluble and is part of a second deposition solution. In some such aspects the second material is a second polyelectrolyte and comprises second crosslinkable moieties. Herein is provided the first aspect, wherein the second crosslinkable moieties are the same as or are different from the first crosslinkable moieties. In some such aspects the nanoparticles are optionally functionalized with second crosslinkable moieties. In some such aspects the second material is deposited prior to deposition of the first polyelectrolyte such that the first polyelectrolyte overlays the second material. In some such aspects the first polyelectrolyte is deposited prior to deposition of the second material such that the second material overlays the first polyelectrolyte. In some such aspects the first polyelectrolyte and the second material form a bilayer, and wherein the method further comprise depositing a plurality of additional bilayers on the surface. In some such aspects the method further comprises crosslinking the first crosslinkable moieties. In some such aspects the crosslinking is initiated by a chemical initiator, a change in environmental conditions, application of electromagnetic energy, or a combination thereof. In some such aspects the first polyelectrolyte is prepared by reacting a first polyelectrolyte with a multifunctional compound. In some such aspects the multifunctional compound comprises a coupling group and a first crosslinkable moiety, and wherein the first polyelectrolyte comprises a complementary coupling group that is capable of reacting with the coupling group of the multifunctional compound. In some such aspects the complementary coupling group and the first reversible bonding moieties are the same groups. In some such aspects the complementary coupling group and the first reversible bonding moieties are different groups. In some such aspects the coupling group and the complementary coupling group form a covalent bond in the reaction. In some such aspects the first reversible bonding moieties are ionic moieties, and wherein the coupling group of the multifunctional compound is capable of reacting with the ionic moieties. In some such aspects the first reversible bonding moieties are non-ionic reactive moieties, and wherein the coupling group of the multifunctional compound is capable of reacting with the non-ionic reactive moieties. In some such aspects the method results in a coating comprising a plurality of layers, wherein any two adjacent layers form a bilayer, and wherein the coating is stabilized by one or more of: (1) ionic attractive forces between any two adjacent layers (2) hydrogen bonding attractive forces between any two adjacent layers; and (3) covalent bonding between bilayers. In some such aspects the surface is a substrate or a coating on a substrate.

In another aspect, there is provided a method for forming a coating solution, the method comprising reacting a polyelectrolyte with a multifunctional compound in a solvent to form a functionalized polyelectrolyte, wherein the polyelectrolyte is water soluble and comprises crosslinkable moieties. In some such aspects the polyelectrolyte is electrostatically charged. In some such aspects the polyelectrolyte comprises a plurality of moieties that have a sufficiently strong dipole moment (e.g. greater than 0.5 Debyes). In some such aspects the polyelectrolyte comprises a plurality of moieties that are electron donors or acceptors. In some such aspects the multifunctional compound is sparingly water soluble or water insoluble. In some such aspects the multifunctional compound comprises a crosslinkable moiety and a coupling group capable of reacting with the polyelectrolyte. In some such aspects the coupling group of the multifunctional compound is capable of reacting with a complementary coupling group on the polyelectrolyte. In some such aspects the complementary coupling group is an ionic group, or is a non-ionic group capable of forming a covalent bond with the coupling group of the multifunctional compound. In some such aspects the solvent is water. In some such aspects the solvent is non-aqueous and the method further comprises isolating the polyelectrolyte from the solvent and combining the polyelectrolyte with water. In some such aspects the reacting forms a covalent bond between the polyelectrolyte and the multifunctional compound. In some such aspects the method further comprises reacting a single polyelectrolyte molecule with a plurality of multifunctional compound molecules, and wherein the polyelectrolyte comprises a plurality of covalently attached multifunctional compound molecules. In some such aspects the crosslinkable moieties are selected from vinyl, acrylates, alkenes, silanes, titanates, epoxy, alkoxy, and combinations thereof.

In another aspect is provided a polyelectrolyte comprising a plurality of crosslinkable moieties and a plurality of ionizable moieties. In some such aspects the polyelectrolyte is water soluble. In some such aspects the crosslinkable moieties are selected from vinyl, alkenes, acrylates silanes, titanates, epoxy, and combinations thereof. In some such aspects the ionizable moieties are selected from anionic and cationic moieties. In some such aspects the ionizable moieties are selected from amines, carboxylates, sulfates, sulfites, phosphates, phosphites, thiols, hydroxyls, and combinations thereof. In some such aspects the polyelectrolyte is prepared by covalently attaching a plurality of multifunctional compounds to a polyelectrolyte. In some such aspects the polyelectrolyte comprises a plurality of complementary coupling groups, each multifunctional compound comprises a coupling group and a crosslinkable moiety, and the coupling groups and complementary coupling groups are capable of reacting to form a covalent bond. In some such aspects the crosslinkable moieties are capable of polymerizing upon initiation with a chemical, environmental, thermal, or radiative stimulus. In some such aspects the polyelectrolyte is a nanoparticle. In some such aspects the polyelectrolyte is a polymeric silane precursor. In some such aspects the crosslinkable moiety and ionizable moiety are the same. In some such aspects the crosslinkable and ionizable moieties are alkyl silanes. In some such aspects the moieties are trialkyl silanes.

In another aspect, there is provided a deposition solution for forming a coating, the solution comprising water and the polyelectrolyte as described herein.

In another aspect, there is provided a coating comprising a polyelectrolyte as described herein and a complementary polyelectrolyte. In some such aspects the complementary polyelectrolyte is functionalized and comprises crosslinkable moieties. In some such aspects both polyelectrolytes are silane polyelectrolytes. In some such aspects the silane polyelectrolytes, when calcined, produce a porous silica network. In some such aspects the silane polyelectrolytes are combined with metal oxide nanoparticles to form a more tightly bound network. In some such aspects the humidity and temperature are selected to improve the crosslinking (extent, speed, etc.) of the film.

In another aspect, there is provided a polyelectrolyte that is synthesized directly possessing ionizable and crosslinkable moieties. In some such aspects there is just a single synthesis step from a commercial material (e.g., in the preparation of MPTMS).

In some of the above aspects, the polyelectrolyte comprises oligomers of TEOS. In some of the above aspects, the polyelectrolyte comprises oligomers of silanes. In some of the above aspects, the polyelectrolyte comprises oligomers of tetraalkoxysilane such as tetraethylorthosilane.

The ionic bonds that are formed in traditional LbL assembled films provide sufficient cohesive strength for the film to robustly assemble. Once the film is dried, however, the chemical, mechanical and environmental durability of these films can be quite low. Introducing crosslinks substantially improves the durability of LbL films. Previously-known crosslinked LbL films involve, for example, thermally induced formation of amide bonds from carboxylic acid and amine groups. Such crosslinked systems, however, exhibit very little ability to satisfy aggressive durability requirements needed for commercial applications. Furthermore, traditional methods are significantly limited in the scope of materials that can be used to prepare crosslinked films.

In some embodiments, an advantage of the methods and materials of the disclosure is that the crosslinked systems are highly robust and durable, and have chemical, mechanical, and environmental durability that is sufficient for commercial applications. Thin films resulting from the methods of the invention have one or more improved properties over films prepared using traditional methods. Such films may, for example, have higher abrasion resistance, greater solvent stability, better adhesion to the underlying substrate, or a combination of these properties. Furthermore, thin films comprising gels can be prepared using the methods of the invention.

For example, films having polymers functionalized with acrylate, epoxy and vinyl functionalities as described herein can be crosslinked extensively and provide a high degree of mechanical robustness.

Another advantage of the LbL deposition methods according to the invention is the ability to use water as a solvent. Aqueous LbL methods are advantageous for at least the following reasons: less risk of flammability problems; less exposure to toxic solvents; reduced cost; and increased environmental friendliness. Furthermore the use of aqueous environments enables the deposition of a wide variety of materials, which include proteins, DNA and other biological molecule where it may be desirable to preserve structure. Among polar protic solvents, water can sustain a higher strength of electrostatic attraction compared with other solvents such as ethanol, and therefore provides greater control and robustness over the deposition process.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains.

Example 1

Preparation of PAA-GPTMS

Materials.

Polyacrylic acid (PAA, 35% in water) and glycidoxypropyl trimethoxysilane (GPTMS) were purchased from Aldrich and used as received.

Functionalization of PAA with GPTMS.

Polyacrylic acid solution (4.28 g, 1.50 g dry basis) was diluted with 100 ml deionized water. The pH of the solution was determined to be 2.5 and used without modification. Glycidoxypropyl trimethoxysilane at various quantities (Table 1) was added dropwise. The mixture was heated to 50° C. with stirring for 24 hours, after which the reaction mixture was removed from the heat. The solution was recovered and diluted with water to 0.25 wt % solid residue basis. The final pH of the diluted solution was determined to be approximately 3.5 and used without further adjustment.

TABLE 1

Stoichiometric ratios for two batches of PAA-GPTMS

| Sample | mL GPTMS | $-CO_2H$/GPTMS mol ratio (theoretical) |
|---|---|---|
| 6-51 | 2.0 | 2.30 |
| 6-58 | 9.2 | 0.50 |

Example 2

Layer-by-Layer Deposition of PAA-GPTMS and Polyallylamine

A LbL spray deposition apparatus (modeled after the systems described in US Patent Application Publication No. US 2010/0003499 to Krogman et al., as well as Krogman et al., *Automated Process for Improved Uniformity and Versatility of Layer-by-Layer Deposition*, Langmuir 2007, 23, 3137-3141) was used to apply solutions directly to substrates. Films containing GPTMS-functionalized PAA and non-functionalized polyallylamine (PAH powder, purchased from Sigma Aldrich) were prepared via a spray layer-by-layer process on 2"×2" pieces of borosilicate glass, using deionized water at either pH 3.5 or pH 9.0 as a rinse following anion or cation deposition respectively. The PAH solution (powder dissolved in deionized water to a final concentration of 0.1 wt %) was sprayed at a pH of 9.0 and a concentration of approximately 0.1% by weight (solids basis). 25 anion/cation bilayers were prepared. Following deposition, the film was dried with forced air and equilibrated at ambient temperature and relative humidity. The films were then post-treated by various time/temperature baking conditions. Control samples of 25-bilayers of PAA and PAH sprayed onto another glass material were also post-treated under similar conditions. A table of samples prepared is given in Table 2.

A film of the product polymer was dried at 100° C. and the residue attempted to be redissolved in water. The presence of gels or insoluble material, as opposed to the dissolution of the residue, confirmed that some crosslinking had taken place.

TABLE 2

Thin films with different GPTMS loadings and post-treatment conditions.

| Sample | Anion | Cation | Post-treatment |
|---|---|---|---|
| C-1 | PAA | PAH | None |
| C-2 | PAA | PAH | 100° C., 30 min |
| C-3 | PAA | PAH | 100° C., 90 min |
| C-4 | PAA | PAH | 125° C., 30 min |
| C-5 | PAA | PAH | 150° C., 30 min |
| C-6 | PAA | PAH | 160° C., 30 min |
| C-7 | PAA | PAH | 175° C., 30 min |
| S1-1 | PAA-GPTMS 6-51 | PAH | None |
| S1-2 | PAA-GPTMS 6-51 | PAH | 100° C., 30 min |
| S1-3 | PAA-GPTMS 6-51 | PAH | 100° C., 90 min |
| S1-4 | PAA-GPTMS 6-51 | PAH | 125° C., 30 min |
| S1-5 | PAA-GPTMS 6-51 | PAH | 150° C., 30 min |
| S1-6 | PAA-GPTMS 6-51 | PAH | 175° C., 30 min |
| S2-1 | PAA-GPTMS 6-58 | PAH | None |
| S2-2 | PAA-GPTMS 6-58 | PAH | 100° C., 30 min |
| S2-3 | PAA-GPTMS 6-58 | PAH | 100° C., 90 min |
| S2-4 | PAA-GPTMS 6-58 | PAH | 160° C., 30 min |

Example 3

Properties of PAA-GPTMS and Polyallylamine Films

Abrasion Testing.

Observations about the hardness of the films prepared in Example 2 were made by drawing a calibrated set of pencils across the surface of the films. Hardness was determined by gauging the softest pencil which could scratch the surface and the softest pencil to penetrate the film. Abrasion resistance tests performed on a Taber abrader using rubber wheels and 250 g load for 100 cycles, following by haze measurements, were also performed.

Qualitative and semi-quantitative observations of the resultant films following pencil hardness testing (as evaluated both by surface scratch and film penetration) and haze increase analysis following Taber abrasion was performed. The data suggested improved hardness for films composed of the GPTMS-modified PAA over the control. There were particularly improved properties for those samples in which the PAA was functionalized under conditions with a high GPTMS/PAA mole ratio. It was also observed that higher temperatures and longer heating times were associated with improved materials properties in the resultant films, likely due to more complete condensation of the silica network.

TABLE 3

Hardness and abrasion observations.

| Sample | Scratch | Penetration | Taber - Haze Increase |
|---|---|---|---|
| C-1 | <2B | H | |
| C-2 | <2B | H | |
| C-3 | B | H | |
| C-4 | <2B | H | |
| C-5 | <2B | H | |
| C-6 | H | H | |
| C-7 | H | 3H | |
| S1-1 | B | H | 0.0092 |
| S1-2 | B | H | 0.0068 |
| S1-3 | B | H | 0.0045 |
| S1-4 | B | H | 0.0039 |
| S1-5 | 3H | 4H | 0.0032 |
| S1-6 | 4H | 5H | 0.0117 |
| S2-1 | B | H | 0.0061 |
| S2-2 | H | 2H | 0.0019 |
| S2-3 | H | 3H | 0.0008 |
| S2-4 | 7H | 7H | 0 |

Example 4

Preparation of Materials

Materials.

Polyacrylic acid (PAA, 35% in water), polyallylamine hydrochloride (PAH), sodium hydroxide, hydrochloric acid, and glycidyl methacrylate (GMA) were purchased from Aldrich and used as received.

Functionalization of PAA with GMA.

Polyacrylic acid solution (4.28 g, 1.50 g dry basis) was diluted with 50 ml deionized water. The pH of the solution was determined to be 2.5 and used without modification. Glycidyl methacrylate at various quantities was added dropwise. The mixture was heated to 50° C. with stirring for 24 hours, after which the reaction mixture was removed from heat and dialyzed against water using 14000 MWCO tubing. The solution was recovered and diluted with water to 0.1 wt %. Sodium hydroxide solution was used to adjust the pH of the final solution to approximately 5.5.

TABLE 4

Stoichiometric ratios for two batches of PAA-GMA

| Sample ID | mL GMA | $-CO_2H$/GMA mol ratio (theoretical) |
|---|---|---|
| 6-9 | 1.0 | 2.75 |
| 6-24 | 0.5 | 5.50 |

Functionalization of PAH with GMA.

1.50 g of PAH was dissolved in 100 ml deionized water. The pH of the solution was adjusted to 10.5 using sodium hydroxide solution. Glycidyl methacrylate at various quantities was added dropwise. The mixture was heated to 50° C. with stirring for 24 hours, after which the reaction mixture was removed from the heat and dialyzed against water using 14000 MWCO tubing. The solution was recovered and diluted with water to 0.1 wt %. Sodium hydroxide solution was used to adjust the pH of the final solution to approximately 9.0.

TABLE 5

Stoichiometric ratios for two batches of PAH-GMA

| Sample ID | mL GMA | $-NH_2$/GMA mol ratio (theoretical) |
|---|---|---|
| 6-19 | 1.0 | 2.12 |
| 6-28 | 2.0 | 1.06 |

Example 5

Layer-by-Layer Deposition of Materials

Layer-by-Layer Deposition and Post-Treatment of GMA-Functionalized PAH/PAA Thin Films.

Films containing GMA-functionalized PAA or PAH (or both) were prepared via a spray layer-by-layer process on 2"×2" pieces of borosilicate glass, using deionized water at either pH 5.5 or pH 9.0 as a rinse following anion or cation deposition respectively. Twenty-five anion/cation bilayers were prepared. Following deposition, the film was dried with forced air and equilibrated at ambient temperature and relative humidity. The films were then post-treated either by exposure for 13 hours to the ultraviolet light in a Class II biosafety cabinet, by heating at 100° C. for 1 hour, both, or neither. Control samples of 25-bilayers of PAA and PAH sprayed onto another glass material were also post-treated under similar conditions. Conditions are summarized in the following table.

TABLE 7

Thin films and post-treatment conditions

| Sample | Anion | Cation | Post-treatment |
|---|---|---|---|
| C-1 | PAA | PAH | None |
| C-2 | PAA | PAH | Heat |
| 1 | PAA-GMA 6-9 | PAH | None |
| 2 | PAA-GMA 6-9 | PAH | Heat |
| 3 | PAA-GMA 6-9 | PAH | UV + Heat |
| 4 | PAA-GMA 6-9 | PAH | UV |
| 5 | PAA-GMA 6-24 | PAH | None |
| 6 | PAA-GMA 6-24 | PAH | Heat |
| 7 | PAA-GMA 6-24 | PAH | UV + Heat |
| 8 | PAA-GMA 6-24 | PAH | UV |
| 9 | PAA | PAH-GMA 6-28 | None |
| 10 | PAA | PAH-GMA 6-28 | Heat |
| 11 | PAA | PAH-GMA 6-28 | UV + Heat |
| 12 | PAA | PAH-GMA 6-28 | UV |
| 13 | PAA | PAH-GMA 6-19 | None |
| 14 | PAA | PAH-GMA 6-19 | Heat |
| 15 | PAA | PAH-GMA 6-19 | UV + Heat |
| 16 | PAA | PAH-GMA 6-19 | UV |
| 17 | PAA-GMA 6-9 | PAH-GMA 6-28 | None |
| 18 | PAA-GMA 6-24 | PAH-GMA 6-28 | None |
| 19 | PAA-GMA 6-9 | PAH-GMA 6-19 | None |
| 20 | PAA-GMA 6-24 | PAH-GMA 6-19 | None |

Example 6

Properties of PAA-GMA and PAH-GMA Films

Scratch testing via spherical indentation is a semi-quantitative technique which can be used to determine ordinal rankings for fracture toughness. In general, wider and deeper scratches on a film of similar morphology are indicative of lower fracture toughness. A film consisting of 50 bilayers of PAH-GMA/PAA-GMA was deposited as described herein. Table 8 compares the width and depth of scratches, using a 1 mm diameter spherical indenter, weighted at 180 g and mounted on a TABER linear abraser, of these films following crosslinking stimulus. Without crosslinking, the PAH-GMA/PAA-GMA control performs nominally like an unmodified film of PAH/PAA. The results indicate that with UV exposure or with UV exposure followed by a 120° C. anneal, the scratch depth decreases, while the scratch width increases. The decrease in scratch depth indicates that the film is more resistant to penetration and possesses a higher fracture toughness. The increased scratch width is indicative of a transfer of energy, orthogonal to the direction of penetration. This is consistent with a higher degree of crosslinking. These results indicate that the crosslinked modified polyions impart a greater degree of mechanical durability compared with uncrosslinked films.

TABLE 8

Scratch Resistant Data

| Sample | Processing Conditions | Scratch Dimensions | |
|---|---|---|---|
| | | Width (μm) | Depth (μm) |
| 1 | Control | 148 | 414 |
| 2 | UV exposure | 179 | 325 |
| 3 | UV exposure + 120° C. anneal | 175 | 307 |

Example 7

Synthesis of Epoxy-Functionalized Silica Nanoparticles

Example General Synthesis:

25 g of Ludox LS-30 (a 30% solution of colloidal silica in water) is diluted with 25 g of absolute ethanol and 25 g of deionized water. The resulting solution is treated with 1M HNO3 until it reaches a pH of 4.0. To this solution is added 2.5 g of glycidoxypropyl trimethoxysilane (GPTMS). The solution is stirred for 48 hours at room temperature.

In a first alternate synthesis, the general synthesis described above is followed except that the amount of GPTMS added was 1.25 g.

In a second alternate synthesis, the general synthesis described above is followed except that the amount of GPTMS added was 5.00 g.

Example 8

Synthesis of Methacrylate-Functionalized Silica Nanoparticles

Example General Synthesis:

5 mL of ammonium hydroxide solution (28% in water) is mixed with 140 mL of absolute ethanol in a 250 mL flask. In a separate container, 7.67 g of tetraethyl orthosilicate (TEOS) and 0.33 g of methacryloxypropyl trimethoxysilane (MPTMS) are dissolved in 40 mL of absolute ethanol. The solution of TEOS and MPTMS are added to the solution of ammonium hydroxide dropwise over the course of 30 minutes with rapid stirring. The mixture is allowed to stir an additional 24 hours at room temperature.

In a first alternate synthesis, the general synthesis described above is followed except that the amount of TEOS used was 7.0 g and the amount of MPTMS used was 1.0 g.

Example 9

Layer-by-Layer Deposition of Epoxy-Functionalized Silica Nanoparticles

A solution of epoxy-functionalized silica was prepared as described in the general synthesis of Example 9 and was diluted with deionized water to yield a final solids concentration of 8 g/l. Sodium hydroxide solution was used to raise the pH of the solution to 8. This was used in conjunction with a 1 g/l solution of polyallylamine (PAH) at a pH of 9.0 and containing 1 g/l of NaCl to fabricate a film via spray layer-by-layer deposition. The resultant film was heated at 110° C. for 1 hour.

Similarly, the above procedure was used to prepare a film using the solution of epoxy-functionalized silica as prepared in the first alternative synthesis of Example 9.

Similarly, the above procedure was used to prepare a film using the solution of epoxy-functionalized silica as prepared in the second alternative synthesis of Example 9.

Example 10

Layer-by-Layer Deposition of Methacrylate-Functionalized Silica Nanoparticles A solution of methacrylate-functionalized silica was prepared as described in the general synthesis of Example 10, was evaporated to approximately half its volume, and then diluted with deionized water to yield a final solids concentration of 8 g/l. Sodium hydroxide solution is used to raise the pH of the solution to 10.0. This was used in conjunction with a 1 g/l solution of poly(dimethyldiallylammonium chloride) at a pH of 10.4 to fabricate a film via spray layer-by-layer deposition. The resultant film was impregnated with a mixture of hydroxyethyl acrylate/hexanediol diacrylate/benzophenone and subjected to ultraviolet radiation to photopolymerize the imbibed monomers.

Similarly, the above procedure was used to prepare a film using the solution of acrylate-functionalized silica as prepared in the first alternative synthesis of Example 10.

Example 11

Synthesis of Acrylate-Functionalized Poly(Acrylic Acid)

5.7 g of a solution of polyacrylic acid (PAA) (35% by weight in water) was mixed with 40 mL of deionized water. To this was added 6.44 g of hydroxyethyl acrylate (HEA). In a separate vessel, 1.33 g of 1-ethyl-3-(3-dimethylaminopropyl)carbodiimide (EDAC) was dissolved in 5 mL of deionized water and subsequently added to the PAA solution. The mixture is allowed to stir at room temperature for 16 hours. The reaction mixture is purified by dialysis using 12-14,000 MWCO tubing vs. deionized water for 5 days.

In an alternate synthesis, the above procedure was repeated, except that 16.56 g of pentaerythritol triacrylate (PETA) was used in place of HEA. Furthermore, after stirring at room temperature overnight, the product polymer precipitated and was purified by multiple washings with water.

Example 12

Synthesis of PMPTES (Silane Polymer) and Preparation of Solution 20 g of methacryloxypropyltriethoxysilane (MPTES, Gelest) was dissolved in 40 ml of toluene (Sigma Aldrich). 2 ml of 2,2'-azobis(2-methylpropionitrle) (AIBN, 0.2M solution in toluene, Sigma Aldrich) was then added to the solution. The mixture was stirred under nitrogen and heated to 70° C. for 16 hours. 5 ml of the polymerization reaction mixture was then diluted with an equal volume of ethanol and 2 ml of a 1M solution of hydrochloric acid in deionized (DI) water. Additional DI water was added until the solution became opaque. The opaque solution was again stirred at 40° C. until once again becoming transparent. The process was repeated several times until the addition of DI water no longer caused the solution to become opaque. The solution was then diluted to 0.1 wt % (solids basis) and the pH was adjusted to 9.5 using sodium hydroxide.

Example 13

Synthesis of p(TMAEA-co-HEA-GPTMS)

5.37 g of [2-(acryloyloxy)ethyl]trimethylammonium chloride (TMAEA) solution (80% in water, Sigma-Aldrich) and 7.73 g of 2-hydroxyethyl acrylate (HEA, Sartomer) were dissolved with 200 ml of deionized water in a 250 ml 3-neck flask equipped with a condenser and nitrogen inlet. 0.2 g of potassium persulfate was added to the reaction flask. The mixture was stirred under nitrogen at 50° C. for 2 hours, after which the temperature was raised to 70° C. for 1 hour, and then lowered to 50° C. for 16 hours. The solution was then removed from heat and poured into a separate container. 16 g of this reaction mixture was transferred to a 250 ml round bottom flask. To this solution, 0.78 g of 3-glycidoxypropyltrimethoxysilane (GPTMS) was added. The mixture was stirred at room temperature for 16 hours after which it was diluted with DI water to 400 ml. The pH of the solution was adjusted to NaOH.

Example 14

Synthesis of Quartenary Ammonium Polyelectrolytes with Pendant Epoxy Groups

Glycidyl methacrylate is polymerized using free-radical initiator to form high molecular weight poly(glycidyl methacrylate). A fraction of the pendant epoxy functionalities are further reacted with trimethylammonium chloride to result in a polymer with quarternary amine functionalities. The resultant product is soluble in water and may then be deposited against an anionic species via LbL, including silica nanoparticles, acrylic acid or polystyrene sulfonate. Subsequent thermal treatment results in crosslinking with itself or with carboxylate groups.

Example 15

Acrylate Functionalized Polyelectrolytes for Layer-by-Layer Deposition Via Maleic Anhydride-Derived Polymers Polyelectrolytes with pendant acrylate functionalities are synthesized by partially derivatizing maleic-anhydride-containing polymers (e.g. Poly(ethylene-alt-maleic anhydride), poly(ethylene oxide-alt-maleic anhydride)) with hydroxylfunctional acrylate monomers (for example, hydroxyethyl acrylate), followed by subsequent complete hydrolysis of residual anhydride functionalities. Residual anhydride functionalities are hydrolyzed by water resulting in carboxylic acid protogenic groups and crosslinkable acrylate groups (mono of multi-functional acrylates).

Example 16

Silane Functionalized Tertiary Amine Polyelectrolytes

Tertiary-amine bearing acrylate monomers are copolymerized with trialkoxysilane bearing acrylate monomers (GPTMS). The resultant polymer was partially hydrolyzed in acidic water to produce silanol-functionalized cationic polyelectrolytes. Furthermore the tertiary-amine can be converted to a quarternary amine using iodomethane.

Example 17

P(DMAEMA-Co-MPTMS) Synthesis in 50/50 Ratio

Dimethylaminoethyl methacrylate (DMAEMA) (5.0 g, 0.0318 mol) and metharcyloxypropyl trimethoxysilane (MPTMS) (7.89 g, 0.0318 mol) are dissolved in 100 mL anhydrous ethanol in a dry 3-neck flask fitted with a nitrogen inlet, thermocouple and condenser. Azobisisobutryronitrile (AIBN) (0.10 g, 0.00061 mol) is added to the reaction mixture which is allowed to stir (with a magnetic stirrer) at room temperature under nitrogen for 30 minutes. The reaction mixture is heated with a heating mantle to 50° C. for 1 hour, 70° C. for 2 hours and then 60° C. for 16 hours before being removed from the heat and allowed to cool to ambient temperature. Percent solids is calculated to be 13.72% by weighing the solid residue of an aliquot of solution which has been allowed to dry in a 110° C. oven for 1 hour.

Example 18

P(DMAEMA-Co-MPTMS) Synthesis in 50/50 Ratio

A polymer is synthesized as in Example 17 except that the quantities of reagents used were 2.50 g (0.0159 mol) of DMAEMA and 11.85 (0.0477 mol) of MPTMS.

Example 19

Spraying Solution Prepared from P(DMAEMA-coMPTMS)

7.29 g of solution (representing 1.00 g of solid residue) from Example 17 is dissolved in 50 mL of anhydrous ethanol. To this is added, with vigorous stirring, water which has had its pH adjusted to 2.0 using dilute HCl so that the final volume of solution is 1.0 L. The pH of this solution is further adjusted to 2.5 using dilute HCl.

Example 20

Quaternization Chemistry

A polymer is synthesized as in Example 17. To 14.58 g of this solution (representing 2.00 g of solid residue, which represents 0.0049 mol of amine groups) is added 0.70 g (0.0049 mol) of iodomethane. The mixture is stirred at room temperature for 18 hours. A solid residue forms. The supernatant liquid is removed and the solid residue is dissolved in 200 mL of $H_2O$.

Example 21

Preparation of Other Deposition Solution

PAH solution. 2.339 g of PAH (Nittobo, 40.4 wt % solution) was added to one liter of deionized water and stirred for 30 minutes. NaOH 10% solution was added dropwise until desired pH was achieved.
Silica Nanoparticles (HS-30, Ludox, WR Grace). Added 27.6 g±0.5% Ludox to 1000 g of deionized water and stir for 30 minutes. Stirred moderately and added NaOH until a pH of 9.5 was achieved.
Rinse water: NaOH was added to deionized water until the desired pH was achieved was achieved.

Example 22

Deposition of Films

Films were deposited using the method and apparatus described in Example 2. 2"×2" borosilicate glass (McMaster Carr) was used as a substrate. For the 25 bilayer PAH/PMPTES film, the PAH solution was prepared by diluting 2.339 g of PAH (Nittobo, 40.4 wt % solution) with deionized water. Rinse water was deionized water with the pH adjusted. The pH of the solutions were all adjusted to 9.0 with HCl and/or NaOH. The film was then subjected to 60 minutes at 130° C. The final film demonstrated a refractive index of 1.29 with good adhesion to the substrate (could not be rubbed off using light abrasion). 25 bilayers of (TMAEA-co-HEA-GPTMS)/HS30 films were deposited using solution and rinse pH of 10.0.

Example 23

Porous Silica Thin Films Via LbL Deposition of Polymeric Precursors

Porous silica based thin films with low RI are prepared via LbL deposition of polymeric precursors. Silane functionalized polymers are deposited via LbL into thin films. The deposited film is then pyrolyzed at elevated temperature, burning off the organic component of the film and leaving behind a uniform silica xerogel film. The film may be used in optical applications requiring low RI. The film also exhibits humidity-response behavior, adsorbing sufficient atmospheric moisture to raise its RI from 1.34 to 1.40. Cationic and anionic polymers which also bear silane groups are deposited against one another via spray LbL. P(DMAEMA-co-MPTMS), prepared from Example 17 is dissolved to 0.1 wt % concentration in a 9/1 water/ethanol mixture and partially hydrolyzed with 1 ml of 1M HCl. The solution's pH is adjusted to 5. 150 bilayers were deposited against a 0.25 wt % aqueous solution of PAA-GPTMS (described in Example 1) at a pH of 4, using rinse water at a pH of 6, using HCl. The resultant films is heated at 100° C. for 18 hours and pyrolyzed by heating from 200° C. to 550° C. over a span of 5 hours, raising 50° C. every 30 minutes.

Example 24

Nanowear Measurements

Residual Depth

Films were prepared from an anionic solution containing 1% wt of silicon dioxide nanoparticles (Nissan Chemical, ST-C) diluted in deionized water and a cationic solution containing 0.1 wt % PAH (Nittobo, 40.4 wt %) diluted in water using the apparatus and method described in Example 2. The pH of the anionic, cationic and rinse (deionized water) solutions were adjusted by adding HCl or NaOH. A sufficient number of bilayers was deposited for film thicknesses to be greater than 500 nm, as measured by touch profilometry (Tencor P-10). Film thicknesses greater than 500 nm were shown to have negligible substrate effects in nanoindentation experiments. Films were then treated to 1110° C. thermal anneal in a convection oven (VWR) and exposed to UV treatment on a conveyor system (Fusion Systems). Samples were allowed to rest overnight.

Film samples were then subjected to nanowear testing in an Agilent Nanoindenter G200. Nanowear tests use a stylus to apply a constant load to the film and then drag a lateral scratch into the film. The resulting depth of the scratch is called "residual depth" where the deeper the scratch, the weaker the film is. In exemplary experiments our data for nanowear tests, averaged from 9 individual measured scratches at each condition, were as follows: for PAH/SiO2, residual depths were approximately: 57 nm at pH 9; 72 nm at pH 6, and 75 nm at pH 4; and for PAH-GMA/SiO2, residual depths were approximately: 43 nm at pH 9; 38 nm at pH 6, and 36 nm at pH 4. At a pH of 9 the degree of ionization in the PAH and PAH-GMA is quite low, though high enough to support electrostatic assembly.

At a pH of 4, the degree of ionization of the polyelectrolytes is high. Regardless of pH conditions the PAH-GMA films exhibited substantively lower residual depths compared with the comparably assembled film using PAH. This is attributed to the presence of the acrylate functionality which can be crosslinked to create a stronger polymeric network. A portion of this improvement is also attributed to mechanical nanowear characteristics due to a higher polymeric content in the films as a result of the GMA functionalization on the properties of the assembled film.

A comparison was conducted of PAH-GMA and PAH assembled films with a variety of silicon nanoparticles of different sizes and shapes (and therefore different refractive indices). On average the PAH assembled films exhibit higher residual depth compared with the PAH-GMA assembled films. For example, selected data for PAH is as follows: at an optical refractive index (RI) between 1.23 and 1.30, the residual depth ranges from about 58 nm to about 90 nm; at an optical RI between 1.30 and 1.38, the residual depth ranges from about 52 nm to just over 70 nm. Selected data for PAH-GMA is as follows: at an optical RI between 1.23 and 1.30, the residual depth ranges from about 55 nm to about 58 nm; at an optical RI between 1.30 and 1.48, the residual depth ranges from about 33 nm to just over 60 nm. In addition, the refractive index of PAH assembled films is limited to a maximum of about 1.37 compared with about 1.49 with the PAH-GMA. Because these PAH/SiO$_2$ and PAH-GMA/SiO$_2$ films are porous, any substitution of volume of air with polymer would cause an increase in the refractive index. The presence of the PAH-GMA decreases the degree of ionization in the polymer, relative to PAH at the same pH condition, and enables the polymer to take on a more coil like morphology, leading to more efficient filling of interstitial spaces in the film. The increased presence of the polymer creates a more co-continuous network leading to stronger mechanical properties.

Example 25

Silane Polymer Performance p(DMAEMA-co-MPTMS) was synthesized using the procedure described in Example 17. The solution was diluted to a concentration of 0.1 wt % and used as a cationic solution and assembled against silicon dioxide nanoparticles (ST-C, Nissan Chemical of America). The pH of the cation and anion was 2.5 and 4 respectively with a deionized water rinse solution pH of 4, all adjusted using HCl. Films were assembled using the apparatus and method described in Example 2. The films were then annealed at 110° C. for 2 hours and the nanowear properties were measured using the methods described in Example 24. The resulting residual depth of the film was 28 nm+/−2 nm indicating superior mechanical properties even over the PAH-GMA/ST-C films highlighted in Example 24. These films were subjected to environmental stress tests including accelerated weathering by QUV (ASTM D4329 and D4587) for 96 hours cycling between 8 hours of UV at 60° C. followed by 4 hours of 50% RH at 50° C. and Damp Heat (E-Spec) for 48 hours under conditions of 60° C. and 90% relative humidity. The film samples were removed from the test chambers and then subjected to nanowear testing. Following QUV and damp heat testing, the residual depths decreased to 19 nm+/−2 nm and 12+/−1 nm, respectively. In both cases, the mechanical strength of the film is shown to increase, thus resisting scratch penetration into the film. To explain this unexpected result, it is hypothesized that the heat and humidity promote continued condensation of the silane groups, leading to an even more crosslinked and well stitched together film morphology.

Example 26

Hydrolysis and Oligomerization of Aminopropyl Triethoxysilane

Aminopropyl triethoxysilane (2.0 g) (Gelest, Inc.) was added to deionized water (2.0 g). The mixture was shaken vigorously and allowed to stir at 20° C. for 30 minutes. After 30 minutes the mixture was diluted to 200 mL with deionized water and the pH was adjusted to 3.0 using dilute HCl, resulting in a cationic solution ready for deposition.

Example 27

Commercially Available Silane Oligomers

Aminopropyl silanetriol (Gelest, Inc.), was purchased and diluted to with deionized water to become a cationic deposition solution with a concentration of 0.1 wt %. Trihydroxysilylpropane sulfonic acid (Gelest, Inc.) was purchased and diluted with deionized water to become an anionic deposition solution with a concentration of 0.1 wt % with the pH adjusted to 2.0.

Example 28

Film Fabrication Using Silane Oligomers

The deposition solution described in Example 26 was deposited, using the apparatus described in Example 2, against a deposition solution prepared from ST-C (obtained from Nissan Chemical America) silica nanoparticles diluted in deionized water to a concentration of 8 g/L and the pH adjusted to 4.0 with dilute HCl. In a separate experiment, the deposition solution described in Example 27 was deposited, using the apparatus described in Example 2, against the deposition solution prepared from ST-C. In an additional experiment, the anionic silane oligomer solution of Example 27 was deposited against the cationic silane oligomer of Example 26 to form a film comprised of only silane oligomers.

Example 29

Synthesis of TMAEMA-MMA 5 g of dimethylaminoethylmethacrylate, 2.74 g of methylmethacrylate (both Scientific Polymer Products), 23 mg of AIBN and 40 ml of THF (Sigma Aldrich) were combined in a 3-neck round bottom flask equipped with stir bar, condenser and nitrogen outlet. The mixture was degassed with nitrogen for 30 minutes and refluxed over night. The mixture was then cooled to room temperature and 3 g of methyl iodide (Sigma Aldrich) was added and stirred for 30 minutes. At this point product precipitated, was filtered, washed with THF and ethanol (Sigma Aldrich), dried at 110° C. for 1 hour to remove residual solvents. This process resulted in a 50% mole fraction of methyl methacrylate (MMA). 0%, 25% and 75% mole fraction MMA copolymers were also prepared. The copolymers were dissolved in water to a concentration of 0.1 wt % and deposited using the apparatus described in Example 2 against HS30 silica nanoparticles (Ludox, WR Grace). The films were removed from the glass substrate with a razor blade and placed in a thermogravimetric analyzer (TA Instruments) for weight loss associated with the pyrolysis of organic material. 0% MMA: 5.63% organic weight loss; 25% MMA: 6.46% organic weight loss, 50% MMA: 9.20% weight loss and 75% MMA: 9.37% weight loss. These results indicated that the fraction of MMA on the copolymer enabled the increased weight fraction of the organic component into the film.

What is claimed is:

1. A method for coating a surface, the method comprising
   (a) depositing a layer of a first material comprising first reversible bonding moieties and first crosslinkable moieties on the surface, said first crosslinkable moieties being selected from the group consisting of vinyl, alkenes, alkenes, acrylates, methacrylates, hydrolysable silanes or oligomers thereof, titanates, epoxy, alkoxides, metal alkoxy precursors, phosphonates, and combinations thereof; and
   (b) depositing a layer of a second material comprising second reversible bonding moieties on the surface,
   wherein the second reversible bonding moieties are complementary to the first reversible bonding moieties and are capable of forming a reversible chemical bond, and
   wherein the first material and the second material form a bilayer; and
   (c) optionally depositing one or more additional bilayers on the surface;
   wherein said first material and said second material are bonded by one or more of:
      (1) ionic attractive forces;
      (2) hydrogen bonding attractive forces; and
      (3) covalent bonding.

2. The method of claim 1, wherein the first reversible bonding moieties are selected from ionic moieties, hydrogen-bonding moieties, ligand-substrate moieties, and antibody-antigen moieties, and wherein the first crosslinkable moieties are chemically attached to the first material.

3. The method of claim 1, wherein the first material is water soluble and is deposited as part of a first deposition solution, and the second material is water soluble and is part of a second deposition solution.

4. The method of claim 1, wherein the second material comprises second crosslinkable moieties, and wherein the method comprises crosslinking the first crosslinkable moieties, crosslinking the second crosslinkable moieties, or crosslinking both first and second crosslinking moieties.

5. The method of claim 1, wherein the first material is a polymer comprising repeat units of formula (I) and repeat units of formula (II)

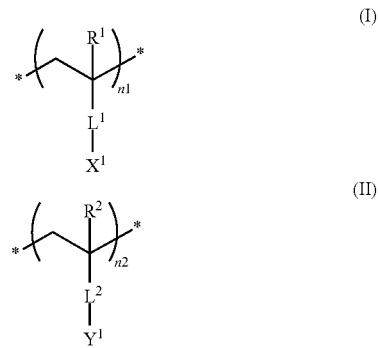

wherein, in formula (I) and formula (II):
n1 and n2 are independently integers;
$R^1$ and $R^2$ are independently selected from H and lower alkyl;

$L^1$ and $L^2$ are linker moieties independently selected from a bond or an alkylene, arylene, or alkenylene moiety, any of which may contain one or more heteroatoms and may be unsubstituted or substituted;

wherein each $X^1$ is one of said first reversible bonding moieties, and is an ionic moiety; and wherein each $Y^1$ is one of said first crosslinkable moieties.

6. The method of claim 1, wherein the first material is a silicon-containing oligomer.

* * * * *